(12) United States Patent
Hall et al.

(10) Patent No.: US 11,178,146 B2
(45) Date of Patent: **\*Nov. 16, 2021**

(54) SYSTEMS AND METHODS FOR ONLINE THIRD-PARTY AUTHENTICATION OF CREDENTIALS

(71) Applicant: ID.me, Inc., McLean, VA (US)

(72) Inventors: Blake Hall, Washington, DC (US); Tanel Suurhans, McLean, VA (US)

(73) Assignee: ID.me, Inc., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/197,797

(22) Filed: Nov. 21, 2018

(65) Prior Publication Data

US 2019/0173879 A1    Jun. 6, 2019

Related U.S. Application Data

(63) Continuation of application No. 14/851,235, filed on Sep. 11, 2015, now Pat. No. 10,142,338.
(Continued)

(51) Int. Cl.
*H04L 29/06* (2006.01)
*G06F 21/31* (2013.01)

(52) U.S. Cl.
CPC .......... *H04L 63/0884* (2013.01); *G06F 21/31* (2013.01); *H04L 63/0838* (2013.01)

(58) Field of Classification Search
CPC .. H04L 63/0884; H04L 63/0838; G06F 21/31
See application file for complete search history.

(56) References Cited

U.S. PATENT DOCUMENTS 9,444,824 B1 * 9/2016 Balazs ................... H04L 63/08
2003/0115142 A1   6/2003 Brickell
(Continued)

OTHER PUBLICATIONS

International Search Report and Written Opinion issued in corresponding International Application No. PCT/US2015/49592, dated Dec. 14, 2015 (14 pages).
(Continued)

*Primary Examiner* — Joseph P Hirl
*Assistant Examiner* — Chi D Nguy
(74) *Attorney, Agent, or Firm* — Bookoff McAndrews, PLLC

(57) ABSTRACT

Systems and methods are disclosed for online authentication of online attributes. One method includes receiving an authentication request from a rely party, the authentication request including identity information to be authenticated and credential information to be authenticated; determining whether a user account is associated with the received identity information by accessing an internal database; accessing user data of the user account determined to be associated with received identity information; determining authentication data to obtained from a user associated with the user account based on the user data of the user account and the credential information to be authenticated; transmitting a request for authentication data; receiving authentication data associated with the user; transmitting authentication data associated with the user; and receiving an authentication result from the verification data source server for the user associated with authentication data.

20 Claims, 15 Drawing Sheets

Related U.S. Application Data

(60) Provisional application No. 62/049,796, filed on Sep. 12, 2014.

(56) References Cited

U.S. PATENT DOCUMENTS

| | | |
|---|---|---|
| 2009/0271621 A1 | 10/2009 | Mendelovich et al. |
| 2011/0030043 A1 | 2/2011 | Jones et al. |
| 2013/0036303 A1* | 2/2013 | Himawan ............ H04L 9/3268 713/158 |
| 2013/0227666 A1 | 8/2013 | White et al. |
| 2015/0319156 A1* | 11/2015 | Guccione ............... H04L 63/08 726/7 |
| 2016/0087957 A1 | 3/2016 | Shah |
| 2016/0189147 A1* | 6/2016 | Vanczak ............... G06Q 20/32 705/71 |

OTHER PUBLICATIONS

International Preliminary Report on Patentability issued in related PCT/US2015/049592, dated Mar. 14, 2017 (3 pages).

\* cited by examiner

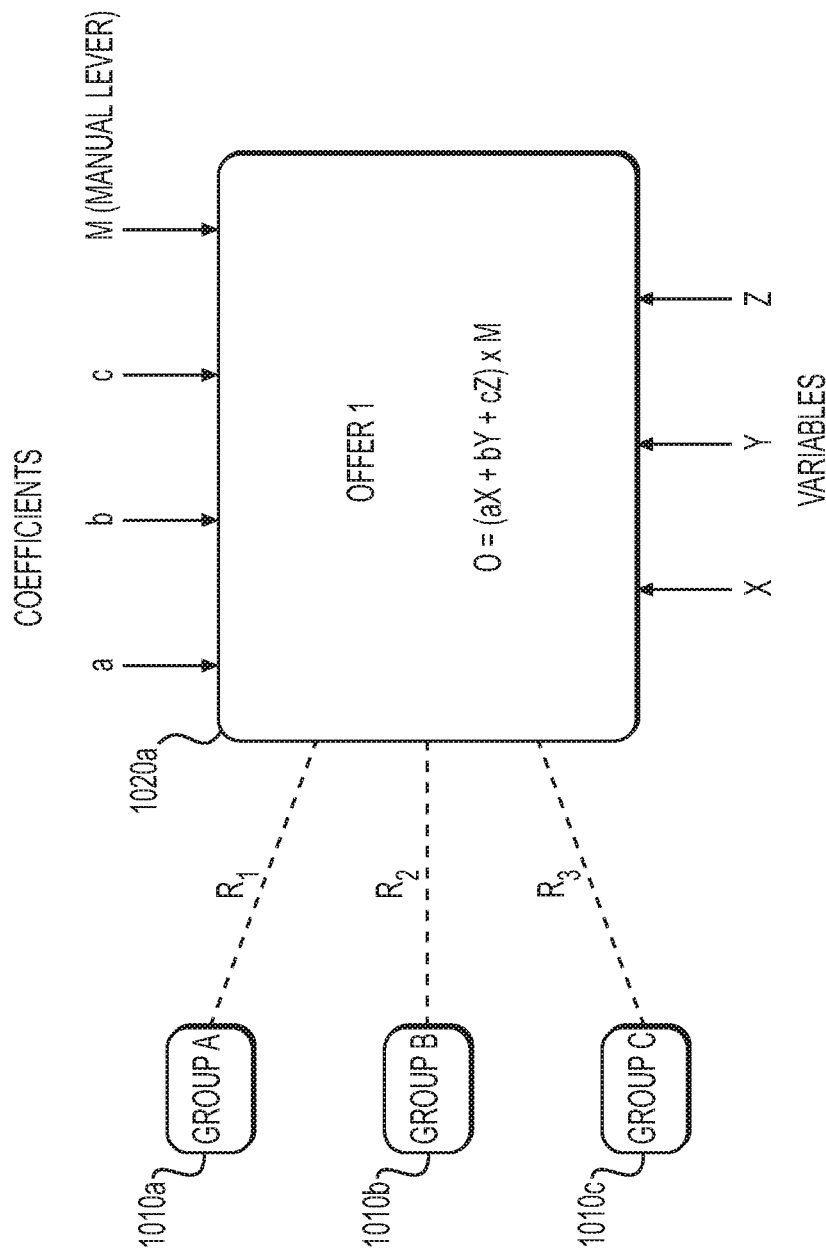

SYSTEMS AND METHODS FOR ONLINE THIRD-PARTY AUTHENTICATION OF CREDENTIALS

CROSS REFERENCE TO RELATED APPLICATIONS

This application is a continuation of and claims the benefit of priority to U.S. Nonprovisional patent application Ser. No. 14/851,235, filed Sep. 11, 2015 (now U.S. Pat. No. 10,142,338 issued Nov. 27, 2018), which claims the benefit of priority to U.S. Provisional Application No. 62/049,796, filed Sep. 12, 2014, the entire contents of which are incorporated herein by reference in their entireties.

TECHNICAL FIELD

Various embodiments of the present disclosure relate generally to online authentication of identities and credentials of the identity. More specifically, particular embodiments of the present disclosure relate to systems and methods for determining an assurance levels for a user being associated with a provided identity and for a credential being associated with the user in a networked environment.

BACKGROUND

Authenticating of a user's identity and/or credential in a networked environment requires the ability to associated a user and/or credential with an online identity, such as a username and/or email address. Assurance levels ("ALs") relate to a degree of confidence that a claimed identity is related to an online identity. Additionally, ALs relate the degree of confidence that a claimed credential is associated with the online identity. Assurance levels have been defined in a number of documents by standards bodies, including the U.S. Office of Management and Budget ("OMB"), International Organization for Standardization ("ISO"), National Institute of Standards and Technology ("NIST"), Federal Identity, Credential, and Access Management ("FICAM"), the Kantara Initiative, etc.

Parties seeking authentication of an online identity and/or a credential of an online identity may require a certain AL before conducting an online or offline transaction with the user being authenticated. The level of assurance (AL) or trust the party requires may be necessary to mitigate risk in their transactions, especially in matters of finance and national security.

The present disclosures relates to systems and methods for providing a remotely verified authentication of online identities and credentials to relying parties, which can be trusted by the relying parties consistent with the determined or requested assurance level.

SUMMARY OF THE DISCLOSURE

Embodiments of the present disclosure include systems, methods, and non-transitory computer-readable media for online authentication of online attributes.

According to embodiments of the present disclosure, a computer-implemented method for online authentication of online attributes is disclosed. One method includes receiving, at a server over an electronic network, an authentication request from a rely party, the authentication request including identity information to be authenticated and credential information to be authenticated; determining, by the server, whether a user account is associated with the received identity information by accessing an internal database; accessing, by the server from the internal database, user data of the user account determined to be associated with received identity information; determining, by the server, authentication data to obtained from a user associated with the user account based on the user data of the user account and the credential information to be authenticated; transmitting, by the server over the electronic network to the user, a request for authentication data; receiving, at the server over the electronic network, authentication data associated with the user; transmitting, by the server over the electronic network to a verification data source server, authentication data associated with the user; and receiving, at the server over the electronic network, an authentication result from the verification data source server for the user associated with authentication data.

According to embodiments of the present disclosure, a system for online authentication of online attributes is disclosed. One system includes a data storage device that stores instructions system for online authentication of online attributes; and a processor configured to execute the instructions to perform a method including: receiving, over an electronic network, an authentication request from a rely party, the authentication request including identity information to be authenticated and credential information to be authenticated; determining whether a user account is associated with the received identity information by accessing an internal database; accessing, from the internal database, user data of the user account determined to be associated with received identity information; determining authentication data to obtained from a user associated with the user account based on the user data of the user account and the credential information to be authenticated; transmitting, over the electronic network to the user, a request for authentication data; receiving, over the electronic network, authentication data associated with the user; transmitting, over the electronic network to a verification data source server, authentication data associated with the user; and receiving, over the electronic network, an authentication result from the verification data source server for the user associated with authentication data.

According to embodiments of the present disclosure, a non-transitory computer-readable medium storing instructions that, when executed by a computer, cause the computer to perform a method for online authentication of online attributes is disclosed. The method of the non-transitory computer-readable medium including: receiving, at a server over an electronic network, an authentication request from a rely party, the authentication request including identity information to be authenticated and credential information to be authenticated; determining, by the server, whether a user account is associated with the received identity information by accessing an internal database; accessing, by the server from the internal database, user data of the user account determined to be associated with received identity information; determining, by the server, authentication data to obtained from a user associated with the user account based on the user data of the user account and the credential information to be authenticated; transmitting, by the server over the electronic network to the user, a request for authentication data; receiving, at the server over the electronic network, authentication data associated with the user; transmitting, by the server over the electronic network to a verification data source server, authentication data associated with the user; and receiving, at the server over the electronic network, an authentication result from the verification data source server for the user associated with authentication data.

Embodiments of the present disclosure include systems, methods, and non-transitory computer-readable media for performing identity verification of an individual. Systems, methods, and non-transitory computer-readable media include the steps of: receiving, at a server over an electronic network, a verification request from a relying party, the verification request including identification information of an individual; determining, by the server, an assurance level associated with the verification request based on the verification request and the relying party; determining, by the server, whether a user account is associated with the received identification information by accessing an internal database; accessing, by the server from the internal database, user data of the user account determined to be associated with received identification information; determining, by the server, authentication data to obtained based on the user data of the user account and the verification request; transmitting, by the server over the electronic network to the user, a request for authentication data; receiving, at the server over the electronic network, authentication data associated with the individual; transmitting, by the server over the electronic network to a verification data source server, authentication data associated with the individual; and receiving, at the server over the electronic network, an authentication result from the verification data source server for the individual associated with authentication data.

Embodiments of the present disclosure include systems, methods, and non-transitory computer-readable media for online authentication of online attributes. Systems, methods, and non-transitory computer-readable media include the steps of: receiving, at a server over an electronic network, an authentication request from a rely party, the authentication request including identity information to be authenticated and credential information to be authenticated; receiving, at the server over the electronic network, a login request for a user account is associated with the received identity information; accessing, by the server from an internal database, user data of the user account determined to be associated with received identity information; determining, by the server, authentication data to obtained from a user associated with the user account based on the user data of the user account and the credential information to be authenticated; transmitting, by the server over the electronic network to the user, a request for authentication data; receiving, at the server over the electronic network, authentication data associated with the user; transmitting, by the server over the electronic network to a verification data source server, authentication data associated with the user; and receiving, at the server over the electronic network, an authentication result from the verification data source server for the user associated with authentication data.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3-1 depicts a flow diagram providing a method in which online identities and/or credentials may be authenticated on behalf of a website and/or application of an relying party, according to one embodiment of the present disclosure;

FIG. 3-2 depicts a flow diagram continuing from FIG. 3-1, providing a method in which online identities and/or credentials may be authenticated on behalf of a website and/or application of an relying party, according to one embodiment of the present disclosure;

FIG. 10D is a block diagram of an offer relationship to groups, according to an embodiment of the present disclosure.

DESCRIPTION OF THE EMBODIMENTS

Figure 1:
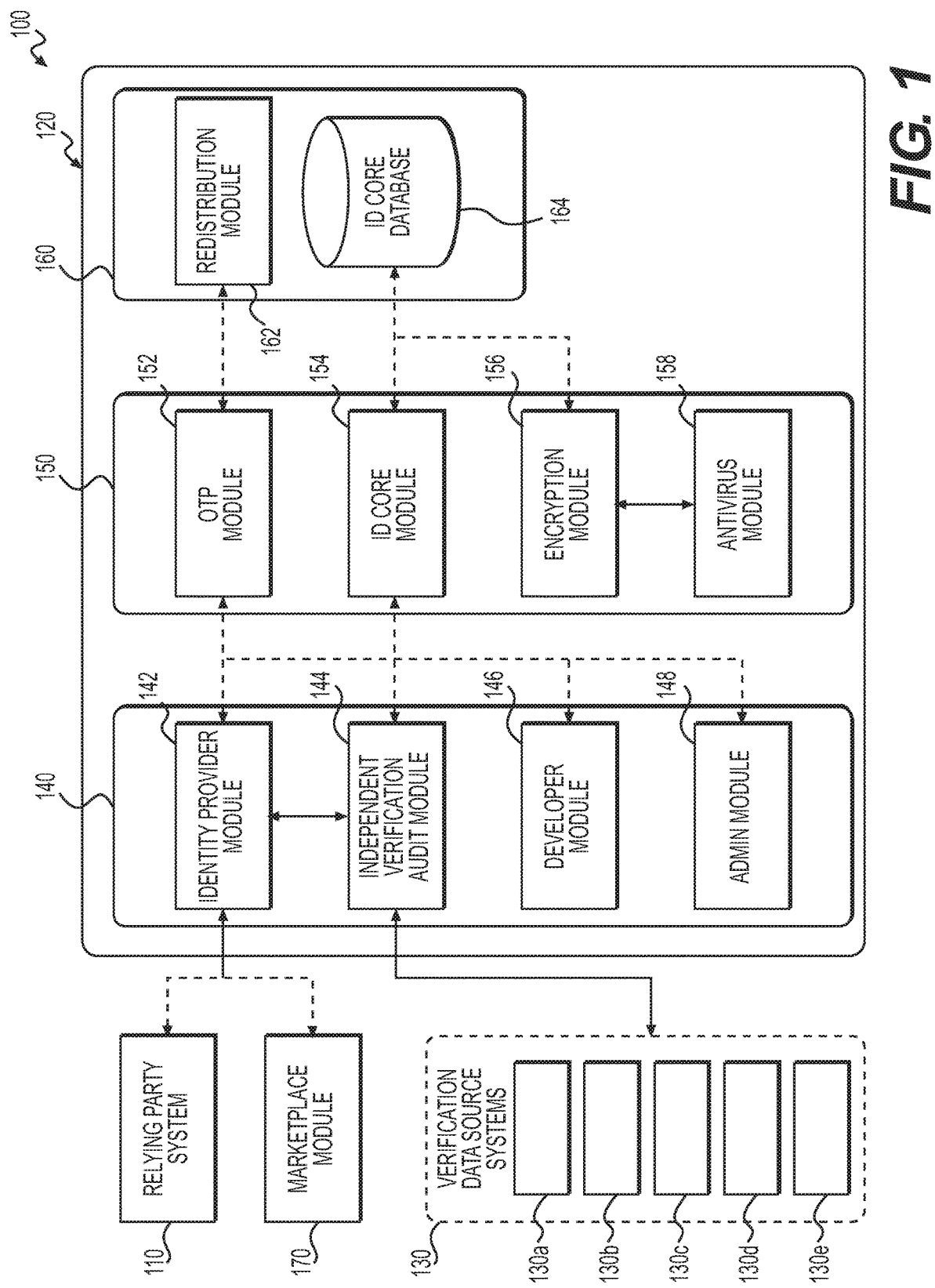
FIG. 1 depicts a networked environment for authenticating a user, according to an embodiment of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

An authentication party may provide authentication services in order to verify an online identity and/or one or more credentials of a user (real person) in a networked environment. The authentication party, in verifying an online identity and/or a credential of a user, may associate the user with an online identity, such as a username, and the one or more credentials with the online identity. When verifying (authenticating) online identities and/or credentials, an assurance level ("AL"), which relates to a degree of confidence that an online identity and/or a credential are associated with the user are accurate, may be determined through various procedures. Online identities, credentials, and associated ALs may all be stored by an authenticating party to serve future authentication requests and/or to preserve histories of changes related to a user.

A relying party ("RP") may be a business or an individual seeking authentication of a user. RPs may provide user related data to the authentication party to request authentication of a new and/or unidentified online identity, to request authentication of a credentials of a user, and/or to seek re-authentication of an online identity and/or credential of a user. Additionally, and/or alternatively, user (real person) may provide user related data to the authentication party to authenticate themselves with an online identity and/or to authenticate a credential.

In order to authenticate a user's online identity and/or credential, the authentication party may access various verification data sources. These verification data sources may provide various trustworthy data related to the user for the authentication party. For example, verification data sources may include, but are not limited to, federal agencies, financial institutions, membership organizations, credit bureaus, national archives, etc.

The authentication party may maintain an internal directory of users in an identity core database. The identity core database may be unpublished and/or inaccessible to third-parties. The identity core database may be used by the authentication party to provide authentication services and/or provide ALs via various online data formats and protocols, such as a SAML, OAuth, OpenID, etc. The process of populating the identity core database may occur in response to a RP seeking authentication of an online identity and/or credential. The authentication party may create and/or implement a pre-defined procedure for a particular RP in order to automatically obtain the requested authentications and/or ALs. The procedures defined for an RP may instruct the authentication party which verification data sources to access in order to provide an authentication and/or a requested AL.

In one embodiment of the present disclosure, authentication requests from a RP may be encrypted and/or signed. Additionally, and/or alternatively, any communications between the authentication party, RPs, verification data sources, and/or users may be encrypted and/or signed by using various cryptology methods, including SSL and/or SOAP.

Users that are being authenticated by an RP may authorize the authentication party to access the verification data sources prior to authentication and/or prior to the authentication being presented to the RP.

FIG. 1 depicts a networked environment 100 for authenticating a user, according to an embodiment of the present disclosure. The networked environment 100 includes a replying party system 110 that may requesting authentication of an online identity and/or credentials of a user, an authentication system 120 that may authenticate the online identity and/or credential, verification data source systems 130 that includes a plurality of verification data sources 130a-130e, which may provide data to authenticate an online identity and/or credential, and a marketplace system 170 that may provide offers to users of the authentication system 120. The authentication system 120 of an authentication party may include front-end system 140, back-end system 150, and database system 160. Front-end system 140 may provide access to resources of authentication system 120 for relying parties, external users, and/or internal users. Front-end system 140 may include an identity provider ("IdP") module 142, an independent verification audit ("IVA") module 144, a developer module 146, and an administration module 148. Back-end system 150 may control access to resources of authentication system 120 and/or may create resources stored in the database system 160. Back-end system 150 may include a one-time password ("OTP") module 152, an identification core module 154, an encryption module 156, and an antivirus module 158. Database system 160 may store resources in databases of authentication system 120 and/or process the transfer of data. Database system 160 may include redistribution module 162 and identification core database 164.

A user to be authenticated may be directed to the authentication system 120 of the authentication party by the relying party system 110 of the RP. The AL required by the RP for an online transaction conducted for relying party system 110 may be provided in an authentication request from the RP. Alternatively, and/or additionally, the AL may be determined by the authentication system 110 by reviewing the authentication request from relying party system 110. For example, the authentication system 120 may determine an AL needed by examining an authentication request for a user from relying party system 110, and cross-referencing the authentication request with one or more predetermined policies associated with the RP. Alternatively, and/or additionally, the authentication system 120 may examine an authentication request for a user from relying party system 110, and may cross-reference the authentication request with one or more previous authentication requests from the RP to determine an AL needed.

Upon receiving an authentication request for a user from relying party system 110, the user may register with the authentication system 120. Registration may occur during the authentication process for the authentication request and/or may occur at a time prior to receiving the authentication request from a relying party system 110. If the user has previously registered with authentication system 120, the IdP module 142 may determine whether user has signed-in to a user account of the authentication system 120 by accessing the identity core database 164 via the identity core module 154.

During the registration process with the authentication system 120, a user may provide user related data, such as a registration email address and a password, to the IdP module 142. In order to ensure a unique identity of the user, the identity provider module 142 may determine whether each registration is unique. In other words, users (real people) are only allowed one account with the authentication system 120. When an email address is used as a unique user identifier in the authentication system 120, the IdP module 142 may determine whether the email address has been registered previously by comparing the email address provided by the user to email addresses store in the identity core database 164. During the registration process, the IdP module 142 may also determine whether the password provided by the user is of sufficient strength. For example, a minimum password strength may be set to require 24-bits of entropy, and/or any other minimum requirement.

Upon satisfying the registration process, the IdP module 142 may provide the user related data to the identity core module 154. The identity core module 154 may create a user account associated with the user including the user related data. The identity core module 154 may also assign the user account an AL of a predetermined level, such as an AL set to 0 for the user associated with the user account. The user account may be stored in the identity core database 164 by the identity core module 154 and/or the IdP module 142. Additionally, when storing the user account, encryption module 156 may encrypt the user account, if desired.

Once the user has registered with authentication system 120 and/or once the user has signed-in to the authentication system 120, the identity core module 154 and/or the IdP module 142 may provide the data of the user account and the authentication request from the relying party system 110 to the independent verification audit ("IVA") module 144.

The IVA module 144 may determine whether an online identity, such as an email address, associated with the user account has been confirmed by the user. For example, if an email address has not been confirmed, the IVA module 144 may transmit a confirmation message to the email address associated with the user account. The confirmation message may include one or more of a confirmation request, a confirmation code, and/or a confirmation form. The IVA module 144 may validate the email address upon the user providing confirmation response. Validation of an online identity, such as an email address, by the IVA module 144 may occur when the user sends an email from the email address, enters a confirmation code in a form provided by the IVA module 144. Upon confirmation of the email address the IVA module 144 and/or the identity core module 154 may set the AL of the email address and/or online identity associated with the user account to 1.

After a predetermined time, the IVA module 144 may suspend a user account when an email address has not been confirmed by the user. The IVA module 144 may reactivate a suspended user account upon confirmation from the user. As mentioned above, when a user is directed to the authentication system 120 by the relying party system 110, the relying party system 110 may also provide a required AL with the authentication request for the user. If the authentication request from the relying party system 110 requires an AL greater than the predetermined level, the IVA module 144 may wait until for a user to confirm his or her online identity before responding to the authentication request.

Once a user has confirmed his or her email address, the user may provide additional information to the IVA module 144 for authentication of credentials and/or to obtain a higher AL level. Independently or through an authentication request from a relying party system 110, the IVA module 144 may instruct identity core module 154 to collate the additional information from the user account with user data previously received and stored in the user account. The additional information may be collated prior, during, and/or after the authentication system 120 seeks authentication from one or more verification data sources 130. The data related to the user of the user account may be transmitted to one or more verification data source systems 130 to obtain authentication of various credentials.

When the authentication system 120 is responding to an authentication request from a relying party system 110, the IVA module 144 may determine whether the user account includes the data required to obtain authentication from one or more verification data sources 130. The IVA module 144 may also determine whether a user needs to confirm, update, and/or re-enter user related data due to the nature of the particular data and/or because the particular data may have expired.

When IVA module 144 requires data from the user and/or input from the user in order to respond to the authentication request, the IVA module 144 may transmit a user data collection form requesting such data. The user may then transmit the completed form and/or transmit the requested data to the IVA module 144. The IVA module 144 may then determine whether the requested data provided is of a valid type or format for the particular authentication request. If the requested data provided is valid, the IVA module 144 may transmit the requested data, along with any other data, to one or more verification data sources 130. IVA module 144 may also instruct identity core module 154 to update the user account stored in the identity core database 164 with the requested data.

A verification data source system, such as verification data source system 130b, may receive the requested data and respond to the request as dictated by its internal systems. One or more verification data source systems 130 may, in response to the transmitted data, provide knowledge based questions ("KBQs") to the IVA module 144 for presentation to the user. KBQs may include questions that require knowledge of personal information of the user. Upon receipt of any KBQs, the IVA module 144 may format the KBQs and/or transmit the KBQs to the user. IVA module 144 may also instruct identity core module 154 to update the user account stored in the identity core database 164 with the KBQs.

When the IVA module 144 receives a response to the KBQs from the user, the KBQ response may be transmitted to the verification data source system that provided the KBQs. IVA module 144 may also instruct identity core module 154 to update the user account stored in the identity core database 164 with the KBQ response. The verification data source system may then return a result of the KBQ response to the IVA module 144.

IVA module 144 may evaluate the KBQ result. IVA module 144 may also instruct identity core module 154 to update the user account stored in the identity core database 164 with the KBQ result. Further, IVA module 144 may instruct identity core module 154 to update the user account stored in the identity core database 164 with other data related to the authentication process, such as the verification data source system used, sources of the verification data, a time/date stamp, etc. In evaluating the KBQ result, the IVA module 144 may determine whether the authentication being requested in the authentication request has passed or failed based on the KBQ result.

Additionally, and/or alternatively, the IVA module may compare the KBQ result to one or more threshold levels associated with one or more ALs. The AL associated with a threshold that the KBQ result meets or exceeds may be associated with the authentication requested. For example, if the authentication requested was a credential of a user, the credential may be associated with the highest AL that the KBQ met. Further, IVA module 144 may also instruct identity core module 154 to update the user account stored in the identity core database 164 with the AL associated with the authentication.

If the IVA module 144 evaluates the KBQ result and determines that the KBQ result was a fail, the IVA module 144 may attempt authentication with the verification data source again, and/or a negative response may be given for the authentication request.

After receiving a response from the verification data source, if the response provided to the IVA module 144 affirms the authentication requested in the authentication request from the relying party system 110, the IVA module 144 may respond to the authentication request and/or the IVA module 144 may request consent from the user to respond to the authentication request.

If an authentication request is for an online identity and a high AL is requested in the authentication request from the relying party system 110, the IVA module 144 may determine whether the authentication request requires a one-time password ("OTP") confirmation via an interactive voice response ("IVR"), a short message service ("SMS"), and/or other method.

If OTP confirmation is to be used, the IVA module may provide required user data to OTP module 152. OTP module 152 may then communicate with the redistribution module 164. Redistribution module 164 may manage and/or control data usage within authentication system 120, which is authorized to receive and distribute credentialing and/or identity related data. The management and/or control of data by redistribution module 162 may be implemented through various data policies defined by the OTP module 152 and/or identity core module 154. Depending on the type of data, redistribution module 164 may process separately credentialing and/or identity related data and other business related data. OTP module 152 may instruct redistribution module 162 to provide certain data to a third-party service provider (not shown) for OTP functions.

When OTP confirmation is required by IVA module 144, the OTP may be provided to the user. For example, the OTP may be provided to a mobile device of the user via SMS. The user may then transmit the OTP to the IVA module 144. The IVA module 144 may determine whether the OTP is valid internally, by transmitting the OTP to the OTP module 152 for validation, and/or transmitting the OTP to a third-party service provider via OTP module 152.

After authentication has been completed for the authentication request, the IdP module 142 may request consent that the relying party system 110 may receive the authentication result from the user. The result of the consent request may be evaluated by IdP module 142. When consent is given by the user, the response to the authentication request may be transmitted to the relying party system 110 that provided the authentication request.

The cryptographic techniques employed by authentication system 120, which include encryption and/or signing by encryption module 156, may be techniques approved under the National Voluntary Laboratory Accreditation Program. Security Assertion Markup Language ("SAML") may be used for exchanging authentication requests and data between parties. Additionally, SAML may be used to limit the lifetime of the data exchanged.

For additional security, each authentication request and responses may be valid only for the single transaction. Further, an authentication request and responses may be provided through separate transactions. If there is a system failure during authentication, no information may be transferred. Single Sign-On functionality may be provided when an online identity and/or credential is submitted for authentication by an RP.

Various online identities, credentials, and/or ALs authenticated in response to a relying party's authentication request may be used only when the respective online identity, credential, and/or AL has an active status. If the online identity, credential, and/or AL is not active, the relying party may not receive a response from the authentication party. Each online identity, credential, and/or AL may be associated with a lifetime that identifies the length of time the online identity, credential, and/or AL is valid.

The status of an online identity, a credential, and/or AL may be maintained in real-time. Additionally, the online identity, credential, and/or AL may be recorded with a status identifier. Status identifiers may include pending, active, suspended, and/or revoked.

An online identity, a credential, and/or AL status may be placed in a pending state when the online identity, the credential, and/or the AL is in the process of being authenticated and/or verified. The online identity, the credential, and/or the AL may be placed in an active status after authentication and/or, in some cases, after an initial registration.

In order for an online identity, a credential, and/or an AL to be placed in an active state from an initial registration, a user may provide predetermined account data. Predetermined account data may include one or more of an email address, a password, a postal address, a cell phone number, etc.

An online identity, a credential, and/or an AL status may be placed in the suspended state, and may require re-registration. For example, a credential may be placed in a suspended state when authentication fails at lower ALs. Alternatively, a suspended state may result when authentication fails after a predetermined number of attempts. Re-activation of the credential may occur after suspension may occur when after a phone-validation of the user and/or after the expiration of a predetermined time-out period.

An online identity, a credential, and/or an AL may be placed in a suspended state when the credential and/or user account has been inactive for a predetermined period. For example, if a credential remains unused for a period of eighteen months or longer, it may be suspended, and may require one or more of the above-described validation steps before being re-activated.

In certain situations, an online identity, a credential, and/or an AL status may be placed in the revoked state. A revocation request for a credential may be received by the authentication party. When the revocation request is received, a credential may be suspended while the revocation request is authenticated. If the revocation request is determined to be authentic, the status may be set to be revoked. If the revocation request is not determined to be authentic and/or is withdrawn before being fully applied, the credential may be re-activated.

At certain ALs, a user may submit a revocation request. For example, at AL 1, users may not be allowed to submit a revocation request. At AL 2, a user may request a revocation, and the authentication party may confirm the request by sending an email requiring confirmation of the request to the email address of record. At AL 3, users may request revocation. The authentication party may confirm the request by sending an email requiring confirmation of the request to the email address of record and may send a second-factor confirmation.

The authentication party may also set a credential status to a revoked state when a third-party submits a revocation request. At all ALs, the authentication party may provide a method in which a recipient of a confirmatory message may respond by stating that he or she has not requested that an account be created. In such cases, an associated account and/or an associated credential may be placed in a revoked state.

The authentication party may also provide a method in which authorized bodies, such as law enforcement, a RP (for cause), and/or other body having a recognized authority, may provide a request revocation. Prior to setting a credential to a revoked state by an authorized body revocation request, the requestor may be authenticated. In an alternative embodiment, the authentication party may place the credential in a suspended state pending further authentication and justification for the revocation request. Further, the authentication party may revoke any credential, to accommodate instances of false representation, failure to comply with a terms of service, and/or for any other reason, at its sole discretion and at any AL. Once a revocation request has been authenticated, revocation status may be effected immediately, and that status used in any subsequent authentication requests. Further, upon a credential being revoked, all interested parties may be notified within a predetermined period, such as 24 hours.

An online identity, a credential and/or an AL validity period may be may be determined by the authentication party. For example, the credential may be valid for five years after sign-up, up to a subsequent event requesting re-verification, and/or until a user accepts any terms and policies set by the authentication party. Further, users may be requested to reaffirm their acceptance of the terms and policies effective periodically to maintain credential validity. Notice detailing how to re-affirm may be provided to the user, and a period of response may be provided, such as fifteen days. In the absence of a re-affirmation, the authentication party may provide an additional period of response, such as five days. In advance of the expiration of the validity period, credentials may be suspended. Further, if re-affirmation is not provided credentials may be revoked indefinitely.

Figure 2:
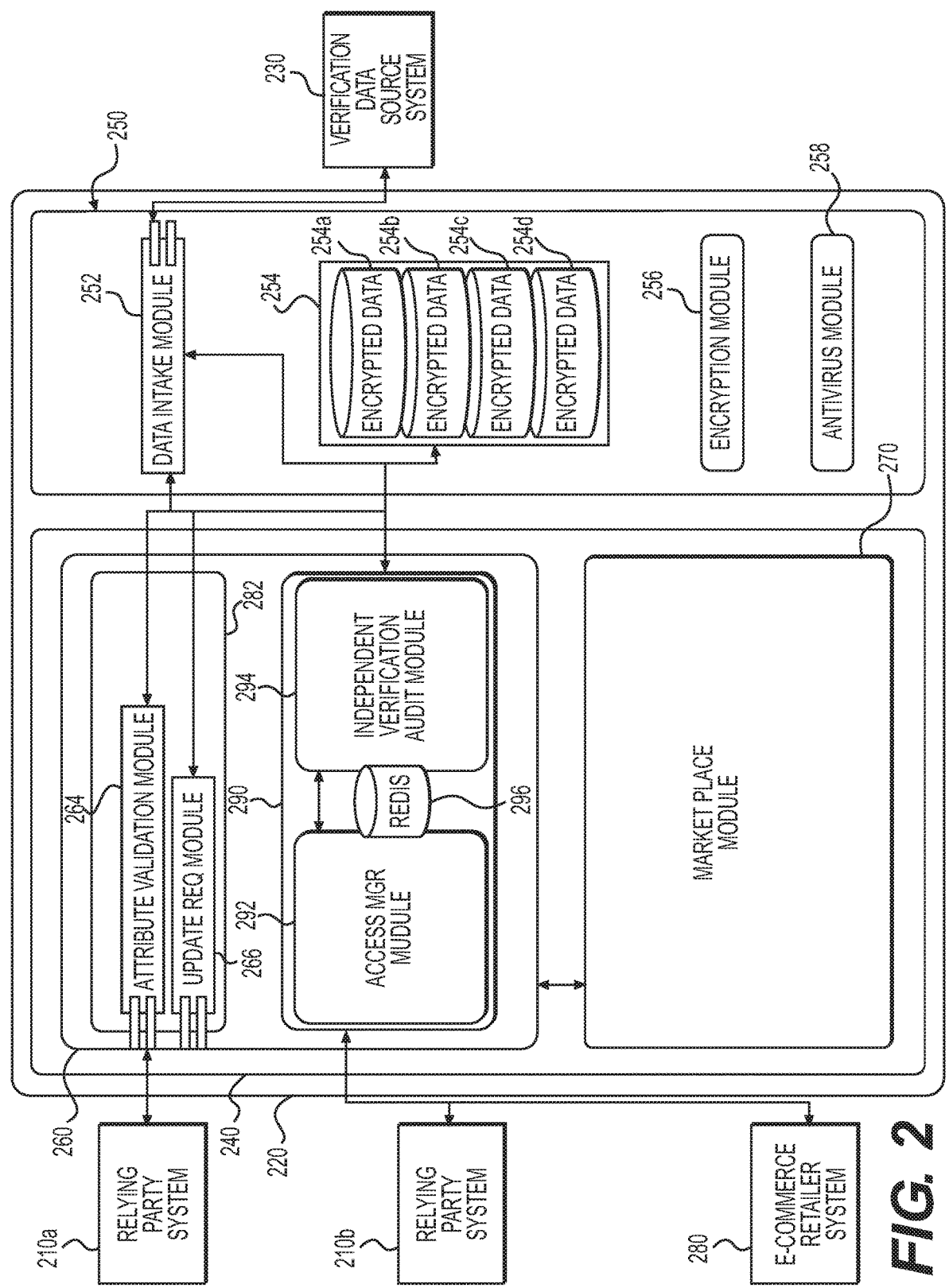
FIG. 2 depicts a networked environment for authenticating a user, according to another embodiment of the present disclosure.

FIG. 2 depicts a networked environment 200 for authenticating a user, according to another embodiment of the present disclosure. The networked environment 200 includes a relying party systems 210a and 210b for requesting credentials of a user, an authentication system 220 for credentialing of the user, verification data source systems 230, which may include a plurality of verification data sources, for verification of a credential, and a e-commerce retailer system 280, which may provide offers and/or request offer from a marketplace module for 270 of the authentication system 220. The authentication system 120 of an authentication party may include a front-end system 240 and a back-end system 250. Front-end system 240 may provide access to resources of authentication system 220 for external users and/or internal users. Front-end system 240 may include identification core module 260 and a marketplace module 270. Identification core module 260 may include an IdP module 262 and an authentication core module 290. IdP module 262 may include an attribute validation module 264 that validates authentication requests from relying party system 210a, and an update authentication request module 266 that obtains updated authentications of users for relying party system 210a. The authentication core module 290 includes an independent verification audit ("IVA") module 294, an access manager module 292 and a redistribution module 296.

Back-end system 250 may control access to resources of authentication system 220 and/or creates resources stored in the encrypted database system 254, include encrypted databases 254a-254d. Back-end system 250 may include a data intake module 252 that receives and/or request user data from verification data source systems 230. Back-end system 250 may store data received from verification data source systems 230 and the identity core module 260 in the encrypted database system 254. Back-end system 250 may also include an encryption module 256, which may provide encryption and/or signing services on data, and an antivirus module 258, which protects back-end system 250 and/or authentication system 220 from malicious code and/or cyber-attacks.

Figures 1, 3:
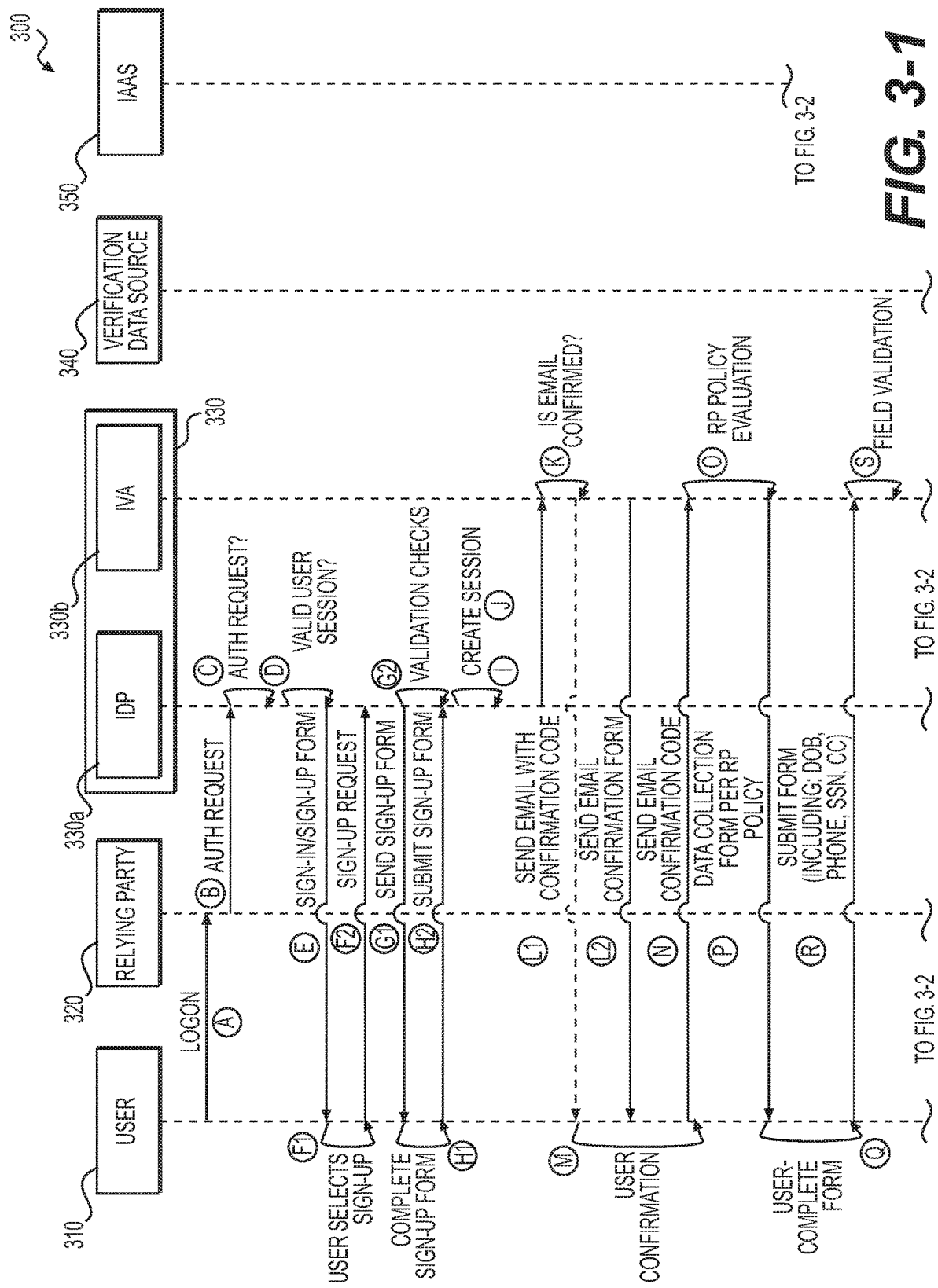
Figures 2, 3:
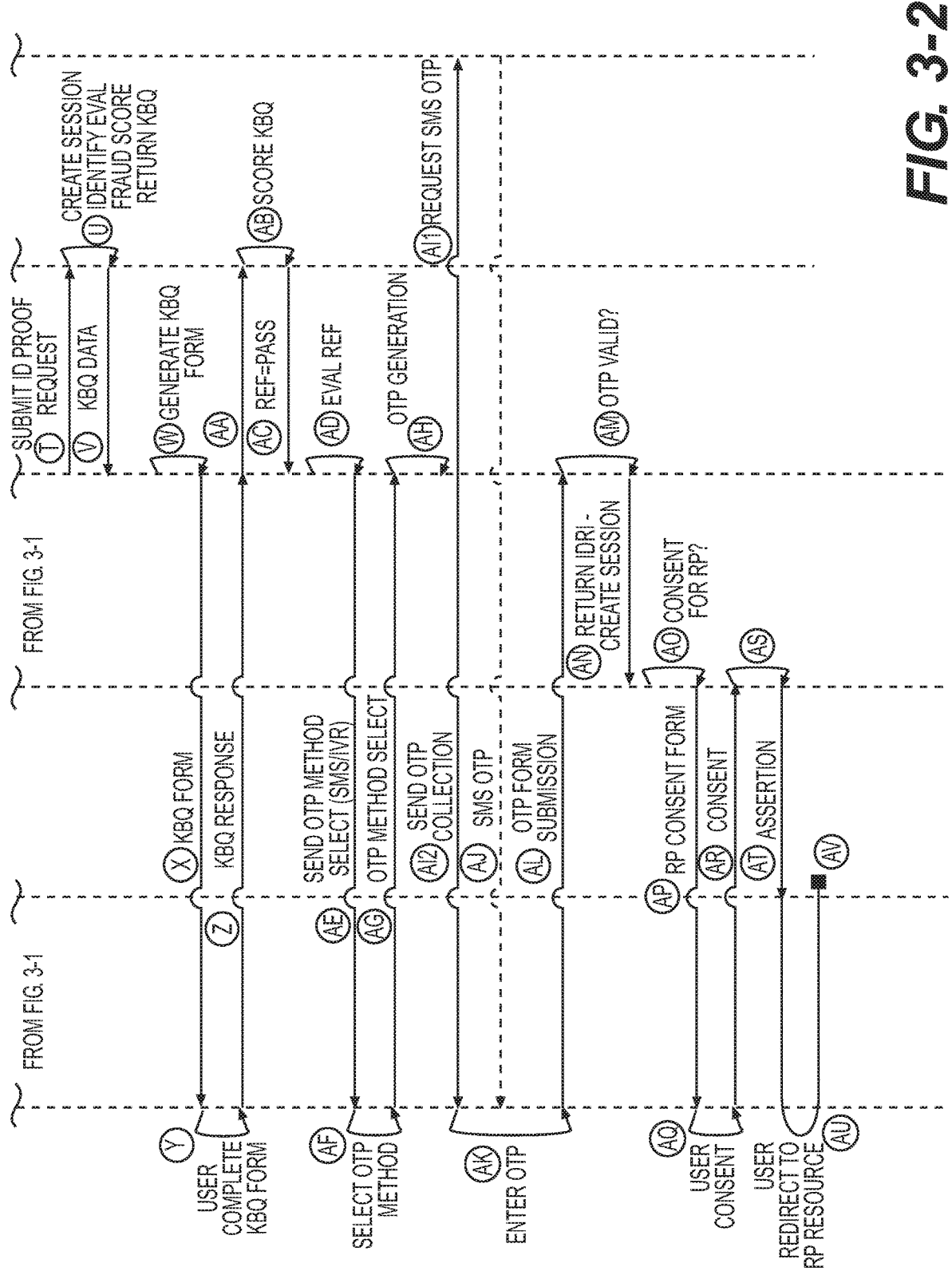

FIGS. 3-1 and 3-2 depict a flow diagram 300 providing a method in which online identities and/or credentials may be authenticated on behalf of a website and/or application of an RP, according to one embodiment of the present disclosure. As shown in flow diagram 300, systems of various parties may be accessed and/or communicate in the process of authenticating an online identity and/or credential of a user. Flow diagram 300 of FIGS. 3-1 and 3-2 include a user system 310, a relying party ("RP") system 320, an authentication party system 330, a verification data source system 340, and an infrastructure as a system ("IaaS") 350. Authentication party system 330 may include an IdP module 330a and/or an independent verification audit ("IVA") module 330b.

Authentication may begin by user system 310 logging into a website and/or application of the RP system 320, as shown by Ⓐ. Alternatively, authentication may begin by user system 310 logging into a website and/or application of the authentication party system 330. The RP system 320 at Ⓑ may then provide an authentication request to the authentication party system 330. For example, the authentication request may request authentication of an online identity of a user at a high AL, such as AL 3.

The IdP module 330a of authentication system 330 may then determine whether the authentication request is valid at Ⓒ. If the authentication request is valid, the IdP module 330a, may determine whether the user session is valid at Ⓓ. If the user session is valid (e.g., the user system 310 is already logged-in to authentication system 330), the IdP module 330a may proceed to Ⓙ. If the user session is not valid, the IdP module 330a may transmit a sign-in and/or sign-up form request to user system 310 at Ⓔ. The user of user system 310 at Ⓕ1 may sign-up for an account with authentication party 330 by selecting and/or requesting a sign-up form. Alternatively, the user may sign-in to his or her account with authentication system 330. If the user of user system 310 selects to sign-up for an account, the user system 310 may transmit a sign-up form request to authentication system 330 at Ⓕ2. The sign-up form request may include a password and an email address of the user of user system 310.

Authentication system 330 at Ⓖ1 may transmit a sign-up form to user system 310, and may determine at Ⓖ2 whether the email address and the password provided by user system 310 passes security validation checks. At Ⓗ1, the user of user system 310 may complete the sign-up form provided by authentication system 330, and transmit the completed form to the authentication system at Ⓗ2.

The IdP module 330a may then create a session for the user system 310 at Ⓘ. Alternatively, if the sign-up form request does not include a password and an email at Ⓕ2, the IdP module may first determine whether the email and the password provided by user system 310 passes security validation checks.

At Ⓙ, an identification request identifier ("IDRI") may be transmitted to the IVA module 330b of authentication system 330. The IVA module 330b may determine whether the email has been confirmed at Ⓚ. If the email has been confirmed, the IVA module 330b may proceed to Ⓞ. If the email has not been confirmed, the IVA module 330b may transmit to user system 310 an email with a confirmation code at Ⓛ1 and/or may transmit an email confirmation form at Ⓛ2. The user of user system 310 may then complete the confirmation and/or confirmation form at Ⓜ, and send the email confirmation form and/or code to IVA module 330b at Ⓝ.

At Ⓞ, the IVA module 330b may evaluate the authentication request of the RP. The IVA module 330b may determine what information is to be requested from the user of user system 310 based on the authentication request. For example, the authentication request from the RL may conform to a previously determined procedure, and IVA module 330b may provide an information request to the user based on a pre-defined procedure. At Ⓟ, the IVA module 330b may transmit a data collection form to user system 310 based on the evaluation of the authentication request.

The user of user system 310 may complete the data collection form at Ⓠ, and transmit the completed form to IVA module 330b at Ⓡ. The completed data collection form may include, for example, date of birth of the user, phone number of the user, a social security number ("SSN") of the user, credit card information of the user, etc. The IVA module 330b may then verify at Ⓢ whether fields of the completed data collection form have been accurately provided and/or entered. The IVA module 330b may then transmit the data of the data collection form to a verification data source system 340, which may be selected based on the authentication request, at Ⓣ. The verification data source system 340 at Ⓤ may then conduct internal procedures, such as create a session, evaluate the identity from the information provided, determine a fraud score, determine knowledge based questions ("KBQ") for the identity, etc. The verification data source system 340 at Ⓥ may transmit the KBQ data to the IVA module 330b.

At Ⓦ, the IVA module 330b may generate a KBQ form, and at Ⓧ, may transmit the KBQ form to user system 310. The user at Ⓨ may complete the KBQ form, and transmit a KBQ response to IVA module 330b at Ⓩ. The IVA module 330b may then transmit the KBQ response to verification data source system 340 at ⒶⒶ. The verification data source system 340 may then score the KBQ response at ⒶⒷ, and transmit a KBQ result to IVA module 330b at ⒶⒸ. The IVA module 330b, at ⒶⒹ, may then evaluate the KBQ result. If the KBQ result is a pass, the IVA module 330b may transmit a one-time password ("OTP") method select to user system 310 at ⒶⒺ. The OTP method select may include a choice of a short message service ("SMS") method and/or an interactive voice response ("IVR") method. If the KBQ result is a fail, the IVA module 330b may proceed to step Ⓣ to re-attempt the request and/or may end.

The user of user system 310 may then select an OTP method at ⒶⒻ, and transmit the selected OTP method to IVA module 330b at ⒶⒼ. At ⒶⒽ, IVA module 330b may generate an OTP collection form based on the selected OTP method. The IVA module 330b may then transmit an OTP collection form to user system 310 at ⒶⒾ2 and transmit a SMS OTP request to IaaS system 350 at ⒶⒾ1. The IaaS system may transmit an SMS OTP to user system 310 at ⒶⒿ. The user of user system 310 may then enter the OTP provided by IaaS system 350 into OTP collection form provided by IVA module 330b at step ⒶⓀ. The user system 310 at ⒶⓁ may transmit the completed OTP form to IVA module 330b. The IVA module 330b may determine whether the OTP is valid at ⒶⓂ. If the OTP is valid, IVA module 330b may transmit a return IDRI to IdP module 330a at ⒶⓃ. If the OTP is not valid, IVA module 330b may proceed to ⒶⒽ, and/or may end.

At ⒶⓄ, the IdP module 330a may then determine whether consent from the user has been given for the RP to access the data resulting from the authentication request. If consent has been given, IdP module 330a proceeds to ⒶⓉ. If consent has not been given, the IdP module 330a transmits a RP consent form to user system 310 at ⒶⓅ. The user at ⒶⓆ may provide consent, and user system 310 may transmit the consent to IdP module 330a at ⒶⓇ. At ⒶⓈ, IdP module 330a may then determine the AL required by RP system 320, and transmit a response to the authentication request if the AL is satisfied at ⒶⓉ. The response may be transmitted in SAML. At ⒶⓊ, the RP system 320 may provide the user of user system 310 with access to RP resources of RP system 320, and the authenticated online identity for the user of user system 310 may conduct transactions with RP system 320 at ⒶⓋ.

When a relying party is requesting a certain AL for an online identity authentication, such as AL 1 and/or AL 2, a single-factor authentication may be used. Single-factor authentication may request a user to submit a username and a password, which may be associated with the user account of the authentication party. On a successful match, the authentication party may notify the RP. At higher ALs, such as AL 3, two-factor authentication may be required, as discussed above with reference to FIGS. 3-1 and 3-2.

The authentication party may also be able to monitor a status of an online identity and/or credential. By monitoring statuses, the authentication party may observe a change in an online identity and/or credential status immediately for use in authentication requests.

After a user has signed-up with the authentication party, the user may renew his or her password at any time by signing-in and entering their new password twice. When a user has an AL 3 credential, a two-factor authentication, as discussed above, may be required before the change is effected and confirmed.

Further, to ensure validity of a user account, the authentication party may require that an email address be registered only with a single user account, and a previously associated email address may not be accepted for any new sign-ups or user account modification.

A user may reset his or her password at any time by providing his or her email address to the authentication party in an appropriate form. The authentication party may compare the provided email address to accounts within its database. If the email address is associated with a user account, the authentication party may generate a random reset token, and transmit an email notification to the email address with a link at which they can then enter a new password. When a user account has a high AL, such as an AL 3, a two-factor authentication, as discussed above, may be required before a change is effected and confirmed.

A log of all relevant security events may be maintained though one or both of an automated logging system and/or a manual logging system for a predetermined time period. Event logs may be retained and protected against unauthorized access, loss, and/or corruption. Additionally, event logs may be used to support audit functions and any investigative processes.

Event logs may include one or more of an event serial number and/or sequence number that provides a unique reference for the event; a date and time of the event; a description of the event; any users, persons, devices, applications, networks and/or operating systems associated with the event; and/or other pertinent information, as discussed below.

For events that relate to a user sign-up, event logs may include information recorded at an initial sign-up, any subsequent changes, and/or whether the sign-up and/or changes were initiated by the authentication party and/or the user. Event information relating to a user sign-up may include one or more of a unique user identifier, references of any specific identifying information sources submitted according to a AL, references to how the identity information was verified, responses received to identity verification, one or more associated devices, and acceptance of applicable terms and policies. Further, events logs may also include information relating to a credential status change.

For events that relate to a credential revocation, event logs may include information regardless of whether the revocation was fully implemented. Event information relating to credential revocation may include one or more of an identity of the requesting source, an authority of the requesting source, measures taken to authenticate the source, the user unique identity associated with the credential for which revocation is sought, a reason for revocation, a revocation decision, i.e. upheld—credential revoked and/or denied—credential reactivated.

Alerts may be provided to the authentication party based on one or more pre-defined thresholds of activity depending on the nature of the event. Further, alerts, actions taken based on alerts, and/or their outcomes may be logged.

Systems of the authentication party may be housed in secure data centers. The secure data centers may be located at geographical alternate sites, and may include multi-layer physical security. Use of such data centers allows for the minimization of opportunities for unauthorized access, disclosure, loss, and/or corruption of sensitive and system information, and of IT resources on which the service is dependent. The location and construction, when combined with other physical security protection mechanisms, such as guards and intrusion sensors, may provide robust protection against unauthorized access to the authentication party's equipment and records and protection from adverse environmental conditions.

If the authentication party uses third-party hosting, the ability of the authentication party to provide facilities that meet the above-described security considerations may be determined either by a physical inspection by the authentication party and/or through review of independent analyses and audits of the facilities.

The authentication party may also use development facilities, which do not process real user data, may also be protected by multi-layer physical security, minimizing the opportunities for unauthorized access, disclosure, loss, and/or corruption of sensitive and system information, and of IT resources on which development is dependent. The authentication party may also use back-up and/or disaster-recovery sites including the same level of protection. A reduced level of security may be permissible to the extent that no real user data is stored. Security may be sufficient to ensure that the sensitivity of proprietary information and the ability to support the production system is not compromised.

The authentication party may also allow information and media transported between sites. Sensitive information and IT resources in the custody of staff of an authentication party may be protected from unauthorized access, disclosure, loss, and/or corruption by having special procedures for use and potential storage in public areas, such as hotels, restaurants, car parks. Further, any back-up and/or disaster-recovery sites may have the same special procedures for the same level of protection.

In the event that the authentication party has sensitive information to be disposed, disposal methods may meet or exceed the requirements and/or policies of various standard setting bodies, including the Department of Defense ("DOD") and/or National Institute of Standards and Technology ("NIST"), in order to ensure that techniques applied match the storage media technology in use. When third-party services are used, those entities may be required to guarantee and take responsibility for observing or exceeding those same requirements and/or policies.

Communications between components of the authentication party and outside of a common demilitarized zone ("DMZ") may be encrypted and/or mutually-authenticated using protocols that meet and/or exceed recognized best practices for a threat scenario used by a risk assessment process. Risk assessments may analyze threats including, but not limited to, password guessing; message replay; eavesdropping; introduction of malicious code; compromised authentication arising from insider action; out-of-band attacks by users, system operators, and/or third-parties; spoofing of system elements and/or applications; malfeasance on the part of a user; and/or intrusions leading to information theft.

User sign-up may be protected by end-to-end encryption, such that all data transfers are secured. Additionally, 24/7 automated monitoring and test script execution may be provided with automated notification to operational personnel. Further, daily system management reports may be produced, reviewed, and/or protectively stored. System management reports may include security events, transactions processed, system usage and/or capacity, and/or system availability.

The authenticating party may employ an identity-based key management architecture. Keys may be assigned key names (identities) and the assigned key names may be used to reference the appropriate key. Key names are may represent a user, a group, and/or a complex process. For example, a key name may be <identifier>@<domain>. Examples of such key names include jdoe@company.com, which represents John Doe's user key; hr@company.com, which represents a HR department of a company's group key; and service123@company.com, which represents a set of services, systems, and/or applications of a company that are allowed to access SSNs in an application infrastructure of the authentication party.

The key naming model may be used with an identity-based encryption, in which the key name may be mathematically converted into a public key, as well as with symmetric encryption algorithms, such as format-preserving encryption ("FPE"), and advanced encryption standards ("AES"), in which the key name may be used to derive a symmetric key.

Initially, an authentication party base key may be generated. A separate base key may also be generated for each encryption algorithm. The identity-based encryption ("IBE") base key may be maintained as a master secret. Further, a one-time backup of the one or more IBE base keys may be performed in order to provide for disaster recovery.

When a key is requested from a Key Management System ("KMS"), the key name may be used to generate the actual keying material, i.e., the symmetric key in the case of symmetric encryption algorithms, such as FPE, AES, and/or triple data encryption standard ("3DES"), and the private key, in the case of IBE. After the requesting entity has been appropriately authenticated, the KMS may use a Key Derivation Function ("KDF") to combine the base key and the key name, producing the actual keying material.

This derived-key approach enables the KMS of an authentication party to be stateless, which allows individual encryption keys to be generated on-demand from a base key. The ability to derive keys may be deployed in a highly distributed environment without the need to continuously replicate keys across servers. For example, if a key is required for disaster recovery or audit purposes, the key may be regenerated.

Keys may have a predetermined lifecycle when used to encrypt data, and may be refreshed on a predetermined schedule. The KMS of the authentication party may incorporate a key expiration and derivation system that allows complete management of a key lifecycle. Keys provided by the authentication party may include an inherent time reference that determines when the key is to be automatically cycled. Additionally, keys may reference distinct base keys, which allows for a procedure-based key refresh.

Figure 4:
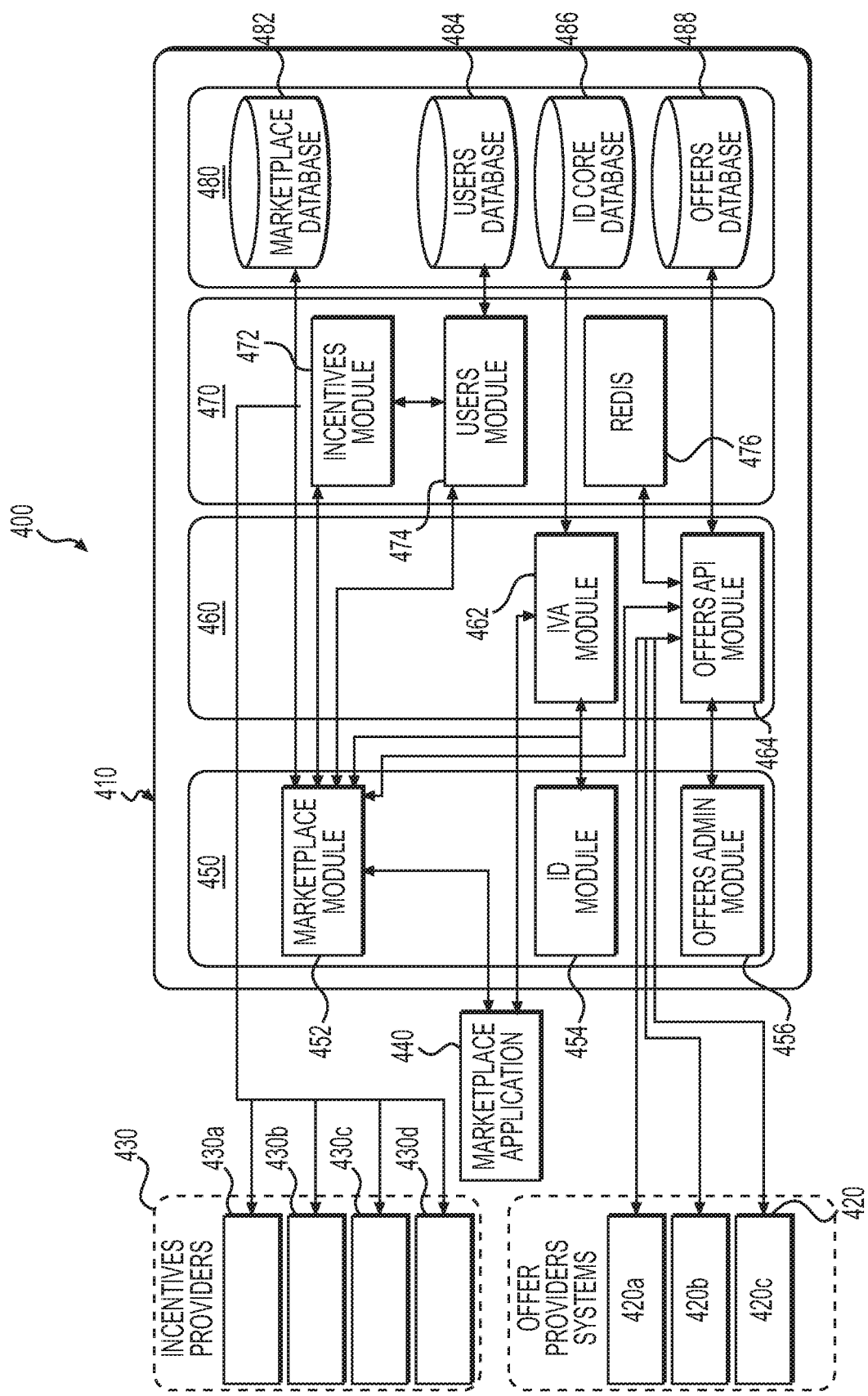
FIG. 4 depicts a networked environment in which authenticated user data may be used to provide incentives, advertisements, and offers, according to an embodiment of the present disclosure.

FIG. 4 depicts a networked environment 400 in which authenticated user data may be used to provide incentives, advertisements, and offers, according to an embodiment of the present disclosure. The networked environment 400 includes an authentication system 410 for credentialing of the user and/or for providing a marketplace that allows certain access to authenticated user data. The networked environment also includes a plurality of offer provider systems 420, including offer provider systems 420a-420c, incentive provider systems 420, including incentive provider systems 430a-430d, and/or a marketplace application 440.

The authentication system 410 may include an applications system 450, a front-end system 460, a back-end system 470, and a database system 480. Applications system 450 may provide access to resources of authentication system 410 for external users and/or internal users via the marketplace application 440. Applications system 450 may include a marketplace module 452 that facilitates the marketplace application 440, an identity module 454 that provides a marketplace identification interface for websites, and offers admin module 456 that allows offer providers to administrate their respective accounts.

Front-end system 460 may provide access to resources of authentication system 410 for external users and/or internal users. Front-end system 460 may include an independent verification audit ("IVA") module 462, which may provide user verification, and an offer API module 464, which may allow offer provider systems 420 to access resources of authentication system 410. Back-end system 470 may control access to resources of authentication system 410 and/or creates resources stored in the database system 480. Back-end system 150 may include an incentives module 472, which may allow incentive provider systems 430 to access resources of authentication system 410, users module 474, which may provide user data to the marketplace module 452 and incentives module 472 from user database 484, and redistribution module 476, which may control and manage the transfer of offers and/or user data. Database system 480 may store resources in databases of authentication system 410. Database system 480 may include a marketplace database 482 for marketplace data, a user database 484 for user data, an identity core database 486 for identity and authentication data, and an offers database 488 for data related to offers.

Figure 5:
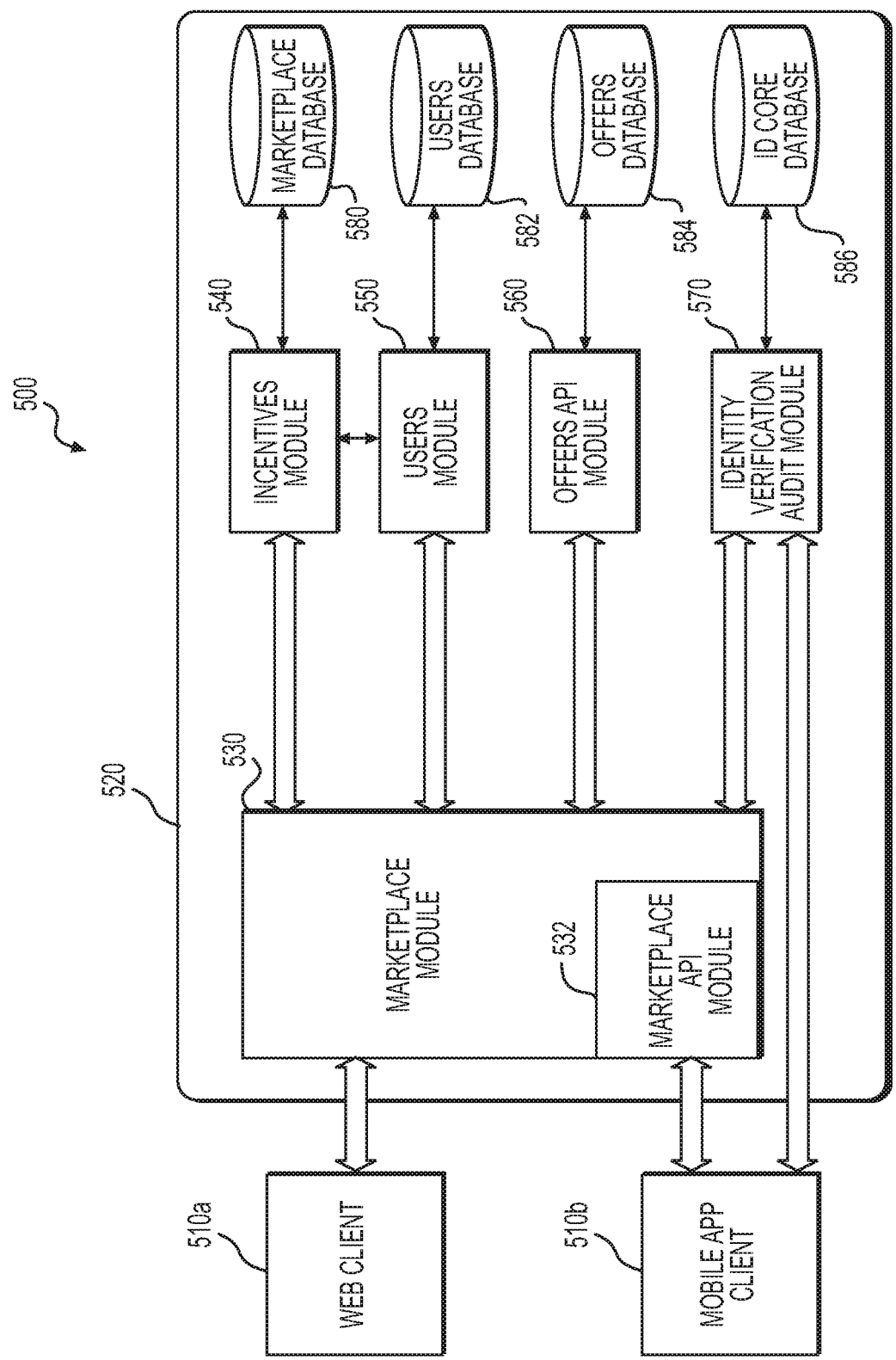
FIG. 5 depicts a networked environment in which authenticated user data may be used in an marketplace by a user, according to an embodiment of the present disclosure.

FIG. 5 depicts a networked environment 500 in which authenticated user data may be used in a marketplace by a user, according to an embodiment of the present disclosure. The networked environment 500 includes networked interfaces 510, such as web client 510a and mobile application client 510b, and an authentication system 520 for credentialing of the user and/or for providing a marketplace that allows certain access to authenticated user data. The authentication system 520 may include a marketplace module 530, an incentives module 540, an users module 550, an offers API module 560, an identity verification audit module 570, a marketplace database 580 for marketplace data, a user database 582 for user data, an identity core database 586 for identity and authentication processing data, and an offers database 584 for data related to offers.

The network interfaces 510 may access the marketplace module 530 of authentication system 520. The marketplace module may include a marketplace API module 532, which may allow the mobile application client 510b to access the marketplace module 530. Marketplace module 530 may provide the networked interfaces 510 with access to content, advertisements, banners, offers, and incentives. Mobile application client 510b may also access the identity verification audit module 570, which may provide authentication of a user of a mobile device, as discussed above.

Incentives module 540 may provide marketplace module 530 with incentive provider related information, such as balances, credits, and/or redemptions. Users module 550 may provide marketplace module 530 with user related data stored in users database 582, and store updated user related data in users database 582. Additionally, users module 582 may send and receive user related data from incentives module 540.

Offers API module 560 may provide marketplace module 530 with offers stored in offers database 584, and store updated offer data in offers database 584. The offers API module may send and receive data related to offers, a vender of an offer, one or more categories of offers, etc. The identity verification audit module 570 may be used to authenticate, verify, receive, and update authenticated user data. Procedures and policies used by identity verification audit module 570 may be stored in the identity core database 586.

Figure 6:
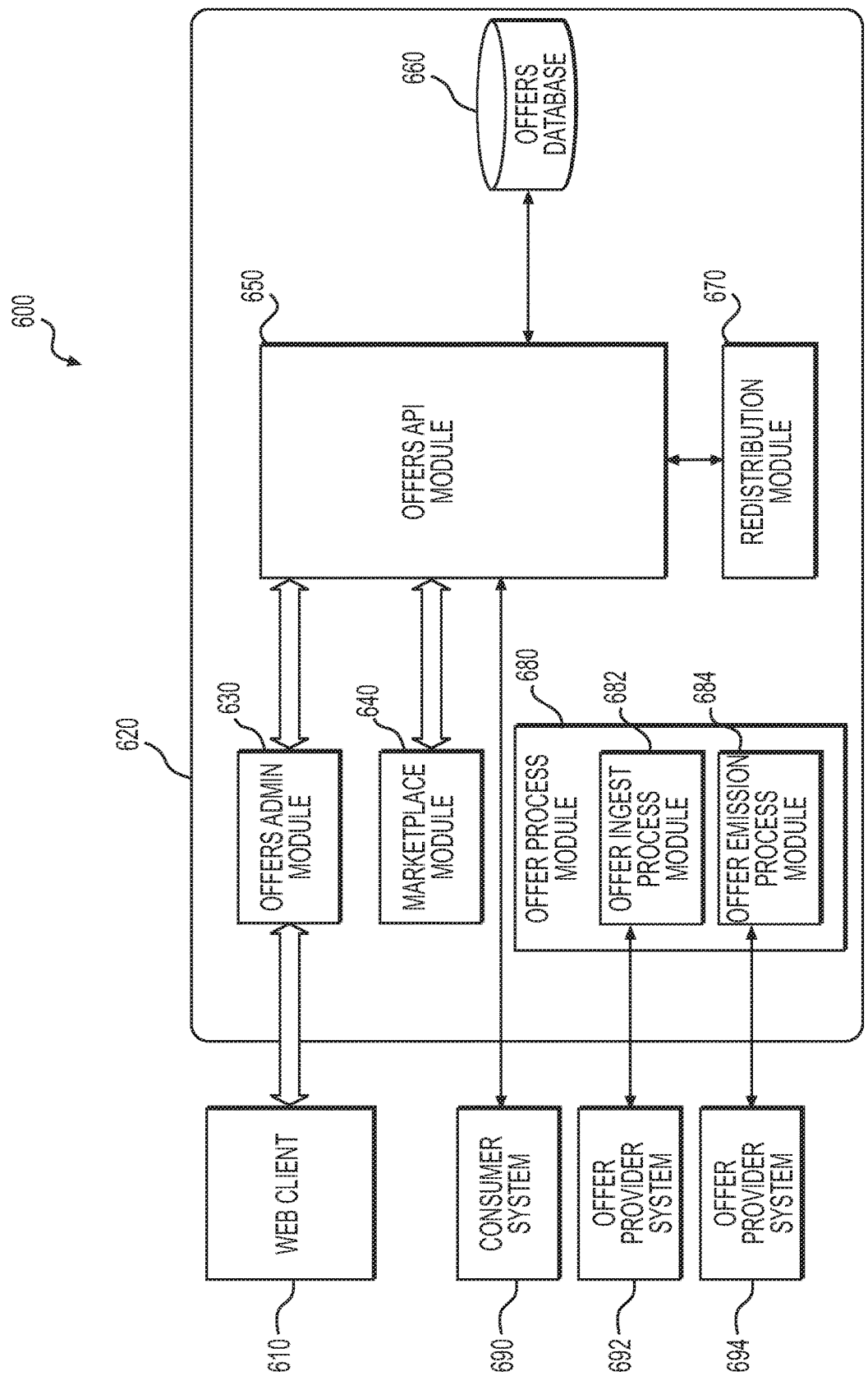
FIG. 6 depicts a networked environment in which authenticated user data may be used in an marketplace by an offers provider, according to an embodiment of the present disclosure.

FIG. 6 depicts a networked environment 600 in which authenticated user data may be used in a marketplace by an offers provider, according to an embodiment of the present disclosure. The networked environment 600 may include a web client 610 for providing access to offers administration module 630, an authentication system 620 for credentialing of the user and/or for providing a marketplace that allows certain access to authenticated user data, a consumer system 690 for receiving offers, and offer provider systems 692 and 694. The authentication system 620 may include the offers administration module 630, a marketplace module 640, an offers API module 650, an offers database 660, a redistribution module 670, and an offer processing module 680.

The offers administration module 630 of authentication system 620 may provide administrative access to internal functions and functions of the offers API module 650 to offer providers, such as offer provider systems 692 and 694. Marketplace module 640 may receive offers from the offers API module 650 for distribution. The offers API module 650 may receive, transmit, update, process, retrieve, and/or store offers. Offers may include offer related data, venders of the offer, categories of the offer, etc. Offers database module 660 may store offers and offer related data provided by offers API module 650. Redistribution module 670 may control and/or manage the transfer of offers and/or offer related data within authentication system 620, transmitted from authentication system 620, and/or received by authentication system 620.

Offer process module 680 may process offers and offer related data received from and/or transmitted to offer provider systems, such as offer provider systems 692 and 694. Offer process module 680 may include offer ingest process module 682 that processes offers received from offer provider systems and offer emission process module 684 that processes offers transmitted to offer provider systems.

Figure 7:
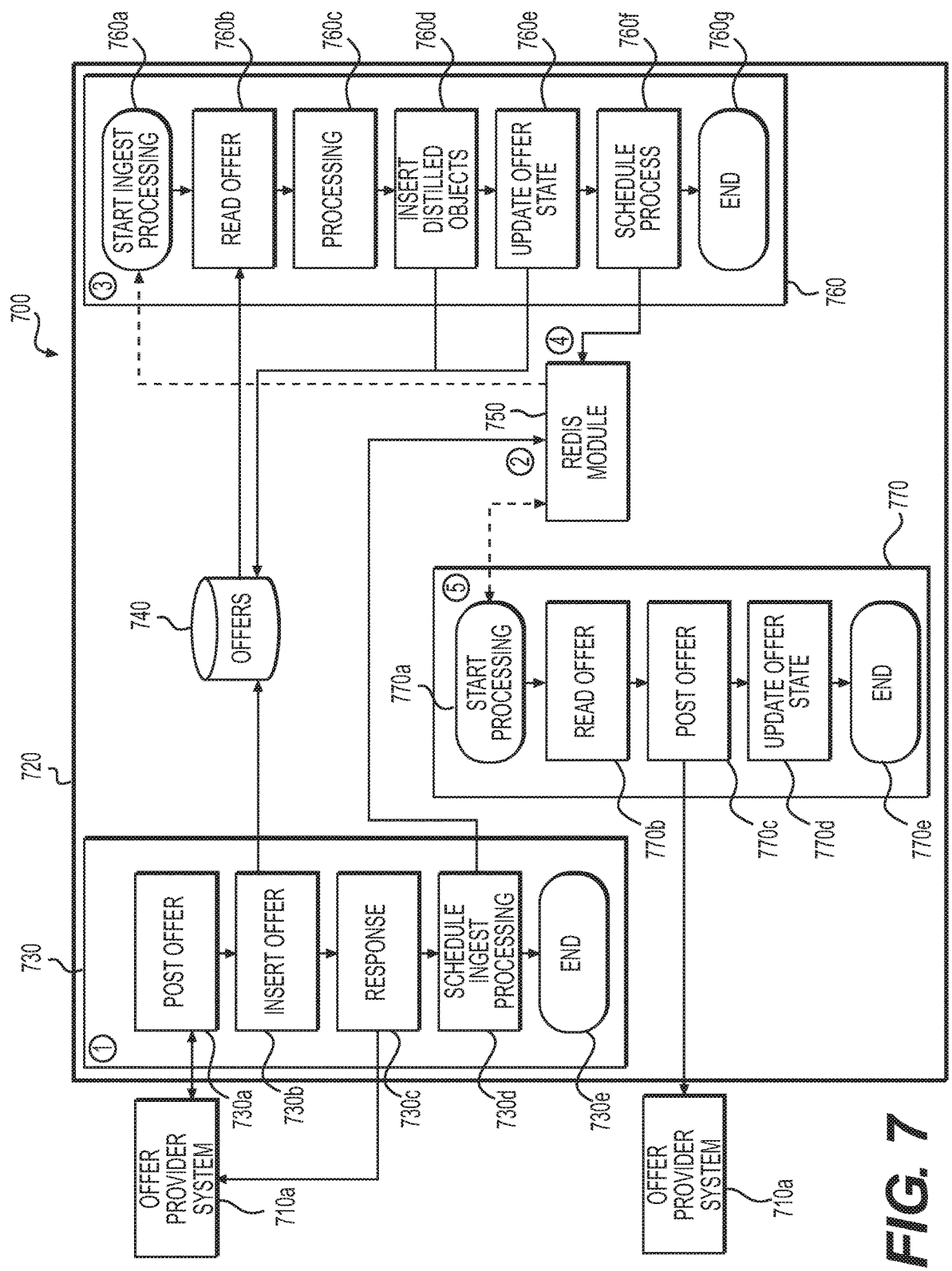
FIG. 7 depicts a flow diagram 700 providing a method in which offers from offer providers may be processed for use in an authenticated user network environment, according to an embodiment of the present disclosure.

FIG. 7 is a flow diagram 700 providing a method in which offers from offer providers may be processed for use in an authenticated user network environment, according to an embodiment of the present disclosure. As shown in flow diagram 700, systems of various parties may be accessed and/or communicate in the process of ingesting an offer to an authentication system. Flow diagram 700 of FIG. 7 may include an offer provider systems 710*a* and 710*b* and an authentication system 720. Authentication system 720 may include a pre-processing module 730, an offers database 740 for retrievably storing offers, a redistribution module 750, an offer ingest process module 760, and a post-processing module 770.

An offer provider system, such as offer provider system 710*a*, may provide (POST) an offer to the pre-processing module 730. Pre-processing module 730 may receive, as shown by ①, the offer at 730*a*, insert the offer into offers database 740 at 730*b*, acknowledge the receipt of the offer by providing a response to the offer provider system 710*a* at 730*c*, schedule ingest processing by offer ingest process module 760 via redistribution module 750 at 730*d*, and end at 730*e* for each offer received.

When the pre-processing module 730 schedules processing of the pre-processed offer, the redistribution module 750, as shown at ②, may control the transfer of the offer from offers database 740 to the offer ingest process module 760 based on the schedule set at 730*d* by pre-processing module 730. As shown at ③, the offer ingest process module 760 may begin upon receiving instructions from redistribution module 750 at 760*a*. At 760*b*, the offer to be processed is received from and/or read from offers database 740. Ingest processing may be performed at 760*c*. Objects, such as distilled objects, may be inserted into the offer at 760*d* and stored in association with the offer in the offers database 740. At 760*e*, a state of the offer may be updated and stored in association with the offer in the offers database 740. Offer ingest process module 760 may then schedule post-processing by the post-processing module 770 via redistribution module 750 at 760*f*. Functions of the offer ingest process module 760 may end at 760*g*.

When the offer ingest process module 760 schedules processing of the ingest processed offer, the redistribution module 750, as shown at ④, may control the transfer of the ingest processed offer from offers database 740 to the post-process module 770 based on the schedule set at 760*f* by offer ingest process module 760. As shown at ⑤, the post-processing module 770 may begin upon receiving instructions from redistribution module 750 at 770*a*. At 770*b*, the ingest processed offer to be post-processed is received from and/or read from offers database 740. Post-processing module 770 may provide (POST) the ingest processed offer to the offer provider system 710*b* at 770*c*. At 770*d*, a state of the ingest processed offer may be updated and stored in association with the offer in the offers database 740. Functions of the post-processing module 770 may end at 770*e*.

Figure 8:
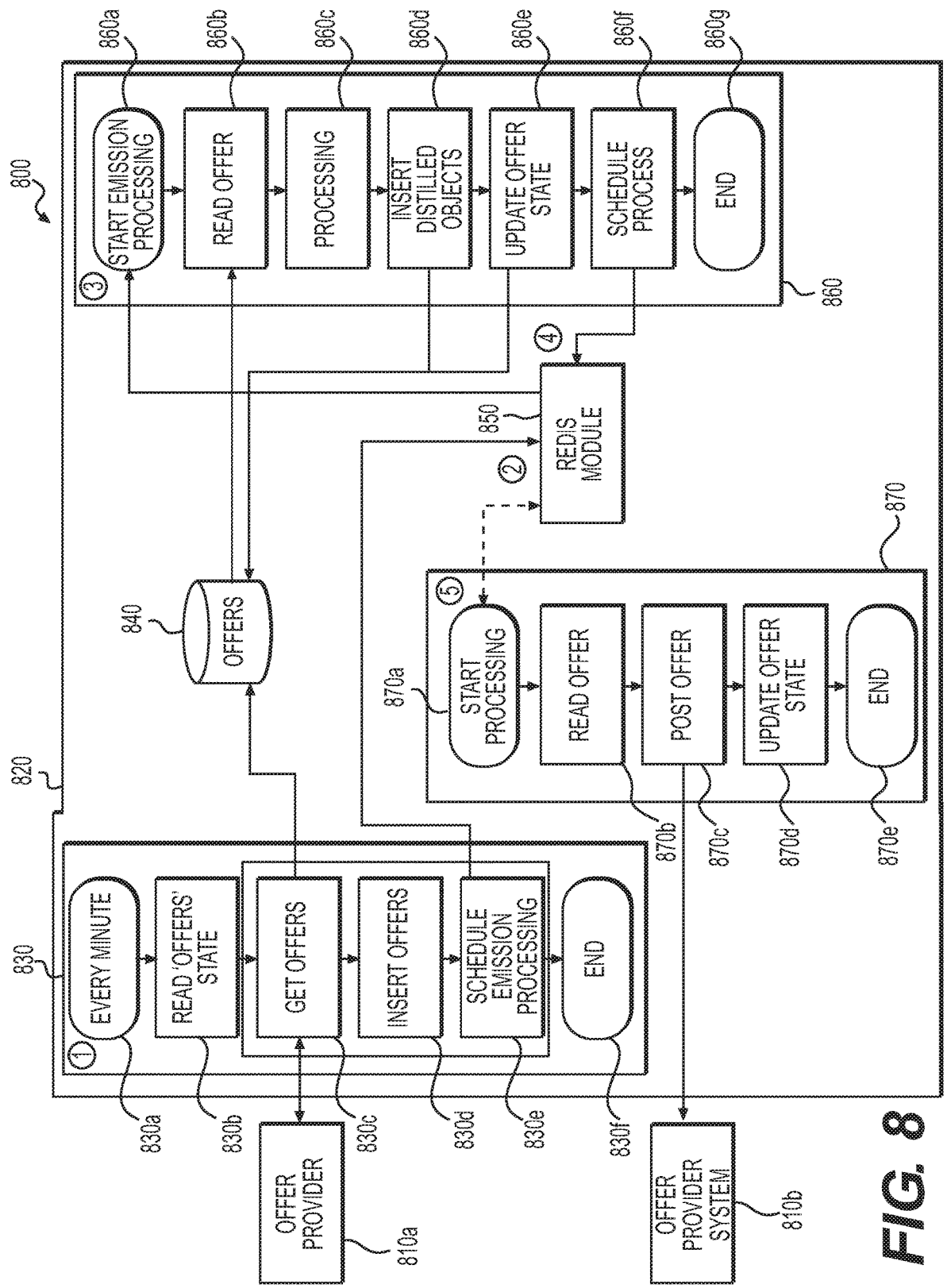
FIG. 8 depicts a flow diagram 800 providing a method in which offers from offer providers may be processed for use in an authenticated user network environment, according to an embodiment of the present disclosure.

FIG. 8 is a flow diagram 800 providing a method in which offers from offer providers may be processed for use in an authenticated user network environment, according to an embodiment of the present disclosure. As shown in flow diagram 800, systems of various parties may be accessed and/or communicate in the process of ingesting an offer to an authentication system. Flow diagram 800 of FIG. 8 may include an offer provider systems 810*a* and 810*b* and an authentication system 820. Authentication system 820 may include a pre-processing module 830, an offers database 840 for retrievably storing offers, a redistribution module 850, an offer emission process module 860, and a post-processing module 870.

An offer provider system, such as offer provider system 810*a*, may request (GET) an offer from the pre-processing module 830. Pre-processing module 830 may begin, as shown by ①, by having the pre-processing module 830 start at a pre-defined period, such as every minute, at 830*a*. Pre-processing module 830 may receive and/or read one or more states of offers from offers database 840 at 830*b*. At 830*c*, pre-processing module 830*c* receives the offer request from offer provider system 810*a* and states of offers. Pre-processing module 830 at 830*d* may select an offer for insertion and provide the offer provider information associated with the selected offer to offers database 840. Pre-processing module may schedule emission processing by offer emission process module 860 via redistribution module 850 at 830*e*, and end at 830*f* for each offer requested.

When the pre-processing module 830 schedules processing of the pre-processed offer, the redistribution module 850, as shown at ②, may control the transfer of the offer from offers database 840 to the offer emission process module 860 based on the schedule set at 830*e* by pre-processing module 830. As shown at ③, the offer emission process module 860 may begin upon receiving instructions from redistribution module 850 at 860*a*. At 860*b*, the offer to be processed is received from and/or read from offers database 840. Emission processing may be performed at 860*c*. Objects, such as distilled objects, may be inserted into the offer at 860*d* and stored in association with the offer in the offers database 840. At 860*e*, a state of the offer may be updated and stored in association with the offer in the offers database 840. Offer emission process module 860 may then schedule post-processing by the post-processing module 870 via redistribution module 850 at 860*f*. Functions of the offer emission process module 860 may end at 860*g*.

When the offer emission process module 860 schedules processing of the emission processed offer, the redistribution module 850, as shown at ④, may control the transfer of the emission processed offer from offers database 840 to the post-process module 870 based on the schedule set at 860*f* by offer emission process module 860. As shown at ⑤, the post-processing module 870 may begin upon receiving instructions from redistribution module 850 at 870*a*. At 870*b*, the emission processed offer to be post-processed is received from and/or read from offers database 840. Post-processing module 870 may provide (POST) the emission processed offer to the offer provider system 810*b* at 870*c*. At 870*d*, a state of the emission processed offer may be updated and stored in association with the offer in the offers database 840. Functions of the post-processing module 870 may end at 870*e*.

Figure 9:
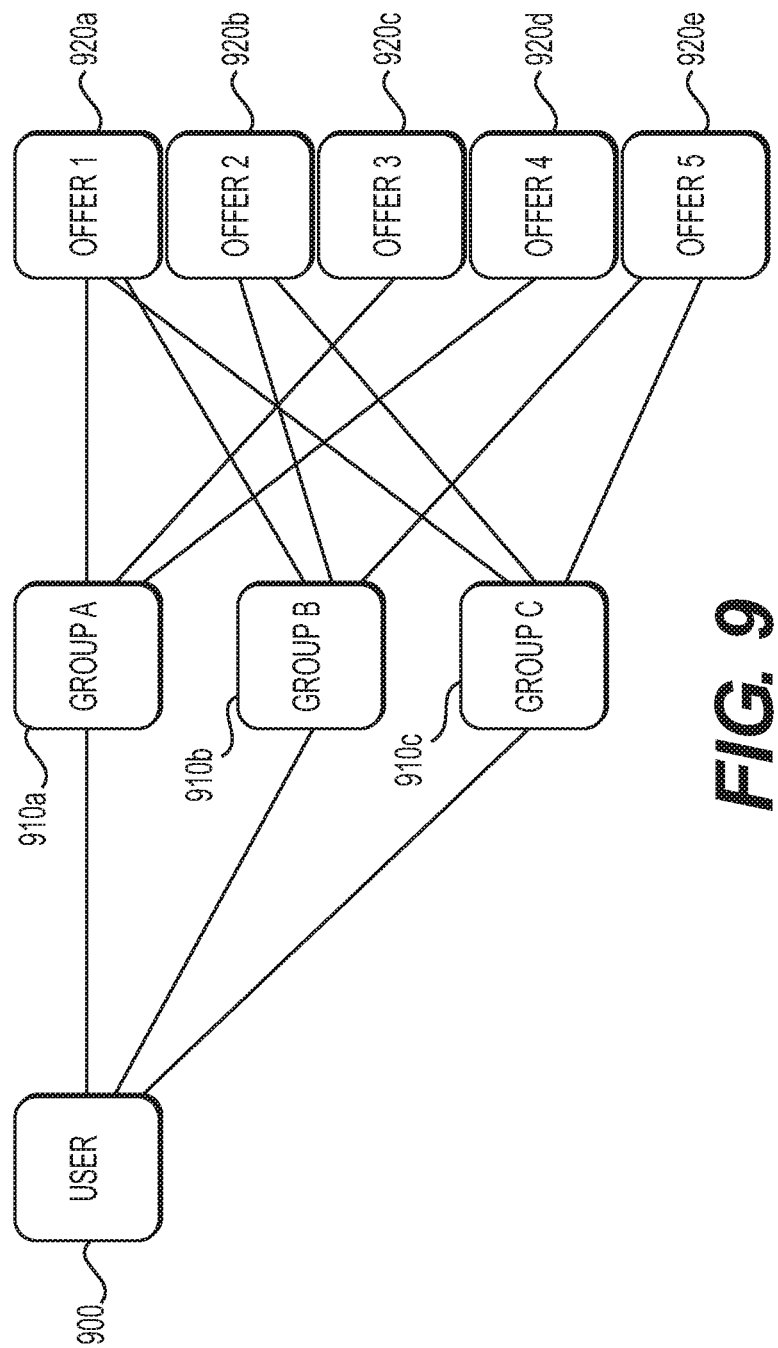
FIG. 9 depicts a block diagram showing a user-group-offer relationship, according to an embodiment of the present disclosure.

FIG. 9 depicts a block diagram showing a user-group-offer relationship, according to an embodiment of the present disclosure. As shown in FIG. 9, a user account 900 may be associated with one or more groups, such as groups 910*a*, 910*b*, and 910*c*. Each group may be associated with one or more offers, such as 920*a*-920*e*. For example, user accounts that are members of group 910*a* may receive offer 920*a*, 920*c*, and 920*d*; user accounts that are members of group 910b may receive offer 920b, 920c, and 920e; and user accounts that are members of group 910c may receive offer 920a, 920b, and 920e.

The relationship between users and offers may be complex and/or nebulous, depending on variables and coefficients of user accounts, groups, and offers. User accounts may be mapped to various market segments based on user data, such as authenticated user data of a user account, discussed above. Market segments may be mapped to groups based on various factors. For example, a user account may be mapped to market segments x, y, and z. If the user account is mapped to market segments x and z, the user account may be mapped to group a. If the user account is mapped to market segments y and z, the user account may be mapped to group b.

Offers may be mapped to various to offer categories based on data related to the offer. Offer categories may be mapped to groups based on various factors. For example, an offer may be mapped to offer categories a, b, and c. If the offer is mapped to offer categories a and c, the offer may be mapped to group a. If the offer is mapped to offer categories b and c, the user account map be mapped to group b.

Figure 10A:
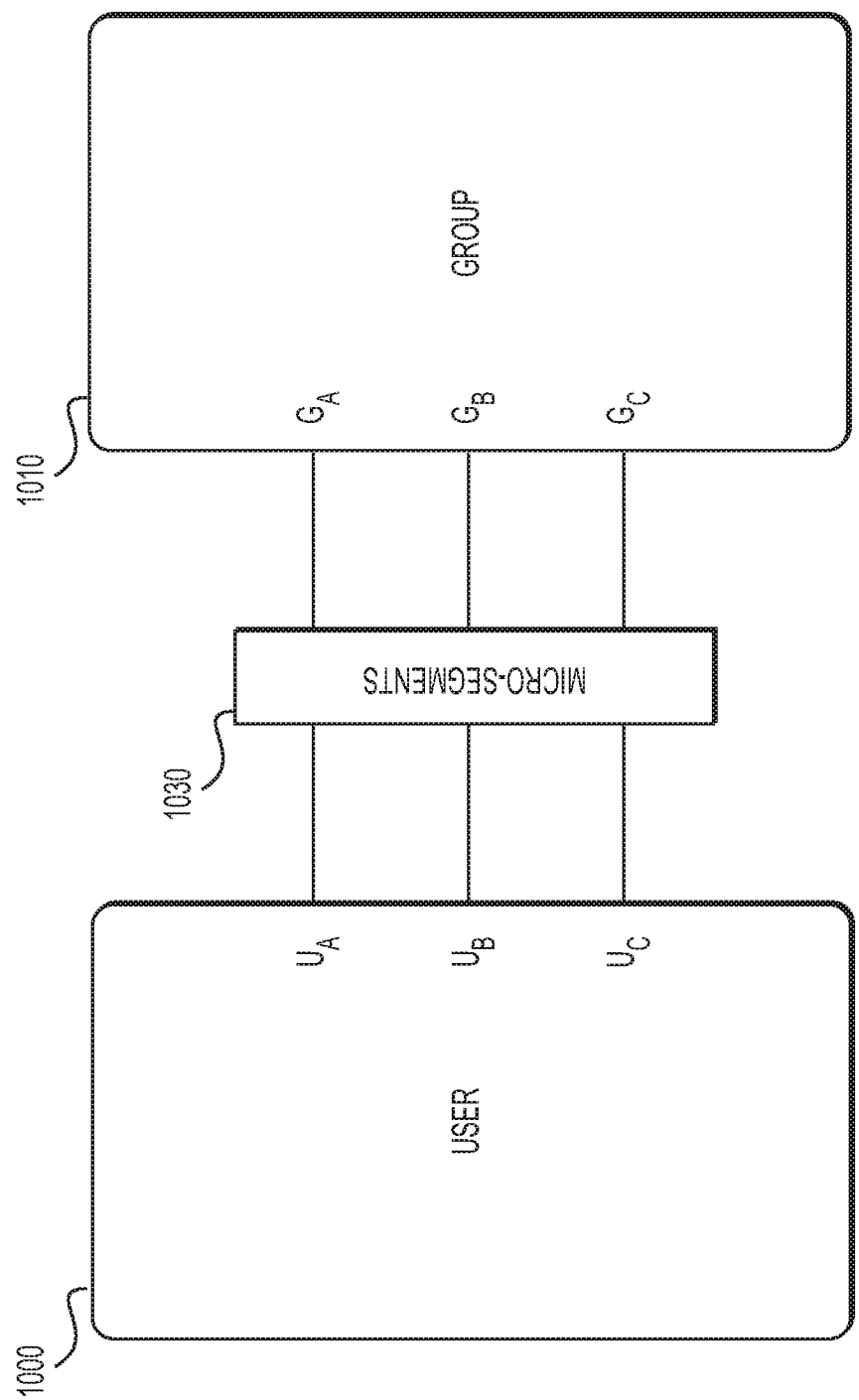
FIG. 10A depicts a block diagram of user account and group relationships, according to an embodiment of the present disclosure.

FIG. 10A is a block diagram that depicts user account and group relationships, according to an embodiment of the present disclosure. Data of a user account 1000 may be used to segment various features relating to a user into user segments, such as user segments $U_A$, $U_B$, and $U_C$. User segments may include broad categories, such as authoritative data points, empirical data points, inferred data points, and extrapolated data points. Authoritative data points of a user account may include an affinity group of the user, a location of the user, an age of the user, etc. Empirical data points of a user account may include advertisement receptiveness, impulsiveness, category preferences, etc. Inferred data points may include income, gender, technology knowledge, etc. Extrapolated data points may include social influence, mood, recent weather, forecasted weather, etc. User segments, such as user segments $U_A$, $U_B$, and $U_C$, may be mapped to micro-segments, such as micro-segment 1030.

Data of a group 1010 may be used to segment various features relating to a group into group-user segments, such as user segments $G_A$, $G_B$, and $G_C$. Group-user segments may relate to broad categories, such as authoritative data points, empirical data points, inferred data points, and extrapolated data points, as discussed above. Group-user segments, such as group-user segments $G_A$, $G_B$, and $G_C$, may be mapped to micro-segments, such as micro-segment 1030. A user quality score Q for micro-segment 1030 may be determined based on values assigned to each user segment and group-user segment. The user quality score Q may be used when mapping a user account 1000 to a group 1010. For example, the user quality score of a micro segment, Q, may be $Q=(U_A*G_A)+(U_B*G_B)+(U_C*G_C)$.

Figure 10B:
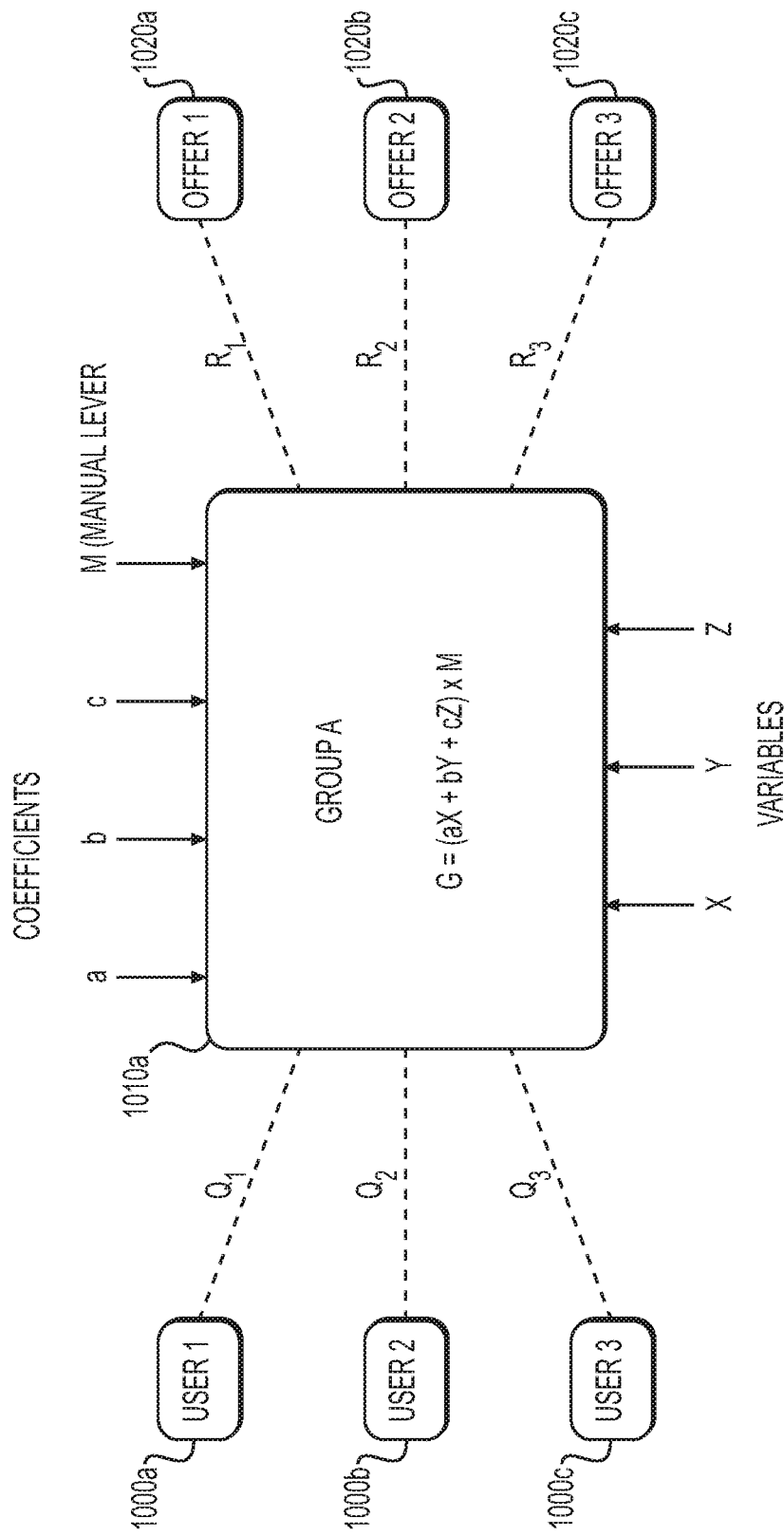
FIG. 10B depicts a block diagram of a group relationship to user accounts and offers, according to an embodiment of the present disclosure.

FIG. 10B is a block diagram that depicts a group relationship to user accounts and offers, according to an embodiment of the present disclosure. A group 1010a may include a group-user segment G. A group-user segment value related to group-user segment G may be determined using various coefficients, variable, and/or manual inputs. The group-user segment value G may be used in determining a user quality score Q, such as $Q_1$, $Q_2$, and $Q_3$, in order to associate user accounts, such as respective user accounts 1000a, 1000b, and 1000c, to group 1010a. For example, a group-user segment value, G, may be $G=(aX+bY+cZ)*M$, where a, b, and c are coefficients, X, Y, and Z are variables, and M is a manual input. Examples of variables X, Y, and Z include, a profitability value, a popularity value, and/or an exclusivity value, each of which may be a dynamic value or static value.

A group-offer segment value related to group-offer segment H (FIG. 10C) may be determined using various coefficients, variable, and/or manual inputs. The group-offer segment value H may be used in determining an offer quality score R, such as $R_1$, $R_2$, and $R_3$, in order to associate group 1010a to offers, such as respective offers 1020a, 1020b, and 1020c. For example, a group-offer segment value H may be the same as the group-user segment value G. Alternatively, group-offer segment value H may be $H=(aX+bY+cZ)*M$, where a, b, and c are coefficients, X, Y, and Z are variables, and M is a manual input. Examples of variables X, Y, and Z include, a profitability value, a popularity value, and/or an exclusivity value, each of which may be a dynamic value or static value. Wherein at least one of the coefficients, variables, and manual input is different from those of the group-offer segment value G.

Figure 10C:
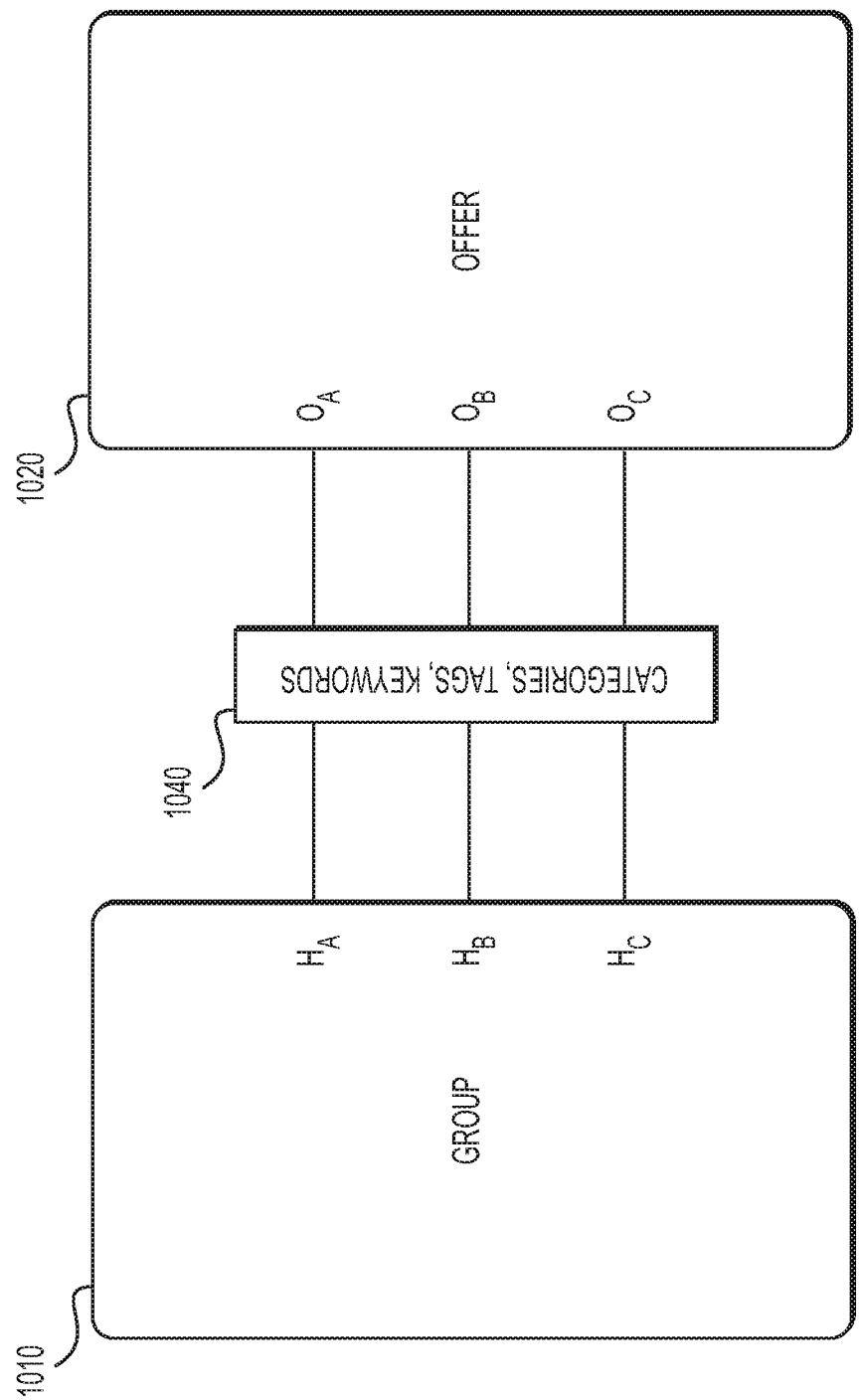
FIG. 10C depicts a block diagram of group and offer relationships, according to an embodiment of the present disclosure.

FIG. 10C is a block diagram that depicts group and offer relationships, according to an embodiment of the present disclosure. Data of a group 1010 may be used to segment various features relating to a group into group-offer segments, such as group-offer segments $H_A$, $H_B$, and $H_C$. Group-offer segments may include broad categories, such as authoritative data points, empirical data points, inferred data points, and extrapolated data points, as discussed above. Group-offer segments, such as user segments $H_A$, $H_B$, and $H_C$, may be mapped to a category, tag, keyword, etc., as shown by macro-segments 1040.

Data of an offer 1020 may be used to segment various features relating to an offer into offer segments, such as offer segments $O_A$, $O_B$, and $O_C$. Offer segments may relate to broad categories, such as authoritative data points, empirical data points, inferred data points, and extrapolated data points, as discussed above. Offer segments, such as offer segments $O_A$, $O_B$, and $O_C$, may be mapped to macro-segments, such as macro-segment 1040. An offer quality score R for macro-segment 1040 may be determined based on values assigned to each group segment and offer segment. The offer quality score R may be used when mapping an offer 1020 to a group 1010. For example, the offer quality score of a macro segment, R, may be $R=(H_A*O_A)+(H_B*O_B)+(H_C*O_C)$.

FIG. 10D is a block diagram that depicts an offer relationship to groups, according to an embodiment of the present disclosure. An offer 1020a may include an offer segment O. An offer segment value may be determined using various coefficients, variable, and/or manual inputs. The offer segment value O of offer 1010a may be used in determining an offer quality score R, such as $R_1$, $R_2$, and $R_3$, in order to associate offer 1010a to a group, such as groups 1010a, 1010b, and 1010c. For example, an offer segment value, O, may be $O=(aX+bY+cZ)*M$, where a, b, and c are coefficients, X, Y, and Z are variables, and M is a manual input. Examples of variables X, Y, and Z include a discount value, a popularity value, and/or a criticality value, each of which may be a dynamic value or static value. An offer segment value H related to offer 1010a may be used to determine the offer quality score R, as discussed above. Overall, values and scores determined for each user, group, offer, and relationship may be used to determine a user-group-offer score S. Such a user-group-offer score S may be $S=(Q*G)+(R*O)$.

Any of the systems, servers, modules, and/or devices, discussed above may include any type or combination of computing systems, such as handheld devices, personal computers, servers, clustered computing machines, and/or cloud computing systems. In one embodiment, the above-described systems, servers, modules, and devices may be an assembly of hardware, including a memory, a central processing unit ("CPU"), and/or optionally a user interface. The memory may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor (DSP) hardware, or any other hardware capable of executing software. The user interface may include any type or combination of input/output devices, such as a display monitor, touchpad, touchscreen, microphone, camera, keyboard, and/or mouse.

Figure 11:
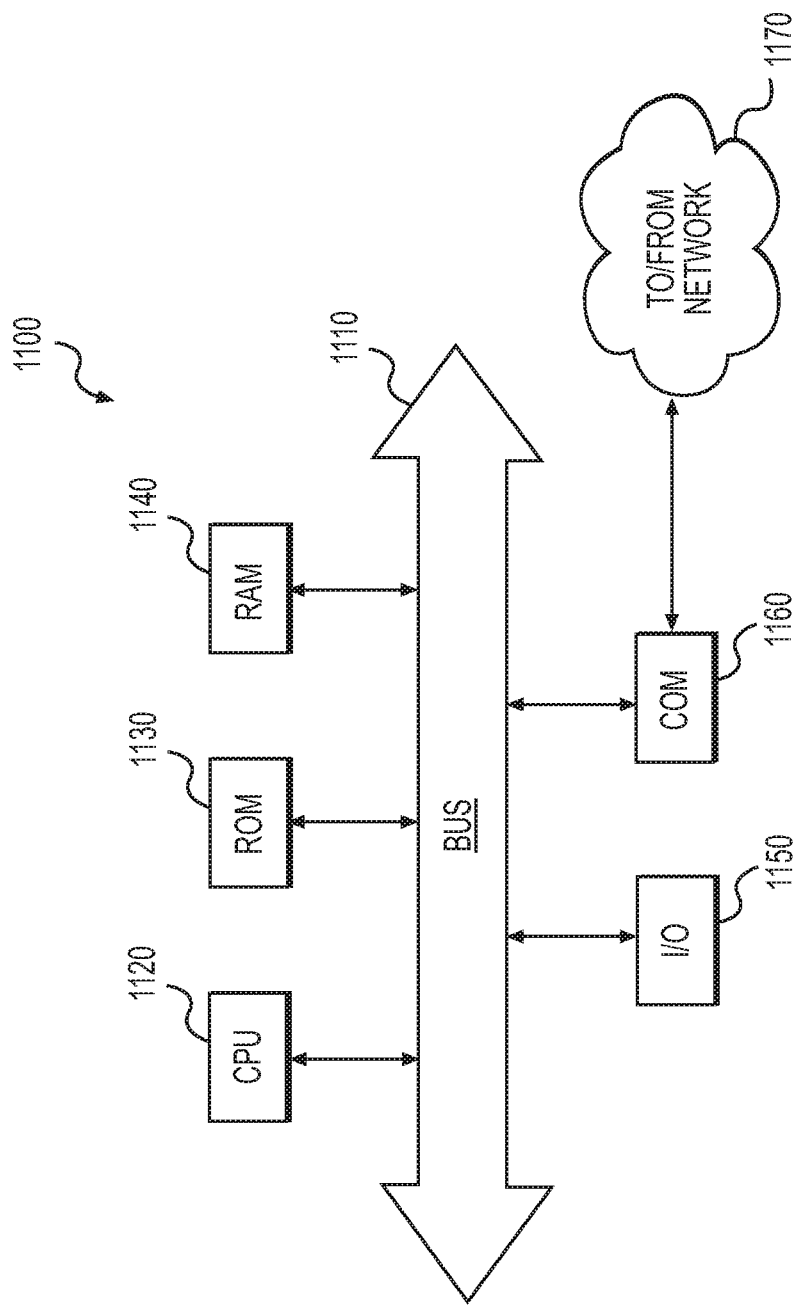
FIG. 11 depicts a simplified functional block diagram of a computer that may be configured as a system, device, module, or server for executing the methods describe in conjunction with the figures above, according to exemplary embodiments of the present disclosure.

FIG. 11 is a simplified functional block diagram of a computer that may be configured as a device or server for executing the methods, procedures, policies, and or calculation discussed in reference to FIGS. 1-10D, according to exemplary embodiments of the present disclosure. Specifically, in one embodiment, as shown in FIG. 11, any of the above-described systems, servers, modules, and/or devices may be an assembly of hardware 1100 including, for example, a data communication interface 1160 for packet data communication. The platform may also include a CPU 1120, in the form of one or more processors, for executing program instructions. The platform typically includes an internal communication bus 1110, program storage, and data storage for various data files to be processed and/or communicated by the platform such as ROM 1130 and RAM 1140, although the system 1100 often receives programming and data via network communications 1170. The server 1100 also may include input and output ports 1150 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to applications and to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for online authentication of online attributes, the method including:
    receiving, at a server over an electronic network, an authentication request from a relying party, the authentication request including identity information to be authenticated and credential information to be authenticated;
    determining, by the server, whether a user account is associated with the received identity information by accessing an internal database;
    transmitting, by the server over the electronic network to a user associated with the user account, a request for authentication data;
    receiving, at the server over the electronic network, authentication data associated with the user, wherein the authentication data includes a status identifier identifying one of a pending, active, suspended, and revoked status, wherein the status identifier is placed in the suspended status after receiving a revocation request and the status identifier is placed in the revoked status after authenticating the revocation request by comparing an assurance level associated with the revocation request to a predetermined assurance level;
    transmitting, by the server over the electronic network to a verification data source server, authentication data associated with the user; and
    receiving, at the server over the electronic network, an authentication result from the verification data source server for the user associated with authentication data.

2. The method of claim 1, further comprising:
    storing, by the server, the authentication data in the user data of the user account associated with the user.

3. The method of claim 1, further comprising:
    encrypting, by the server, the authentication data in the user data of the user account associated with the user.

4. The method of claim 1, further comprising:
    transmitting, by the server, the authentication result of the authentication request to the relying party.

5. The method of claim 1, further wherein the authentication data further includes a lifetime value, wherein the lifetime value identifies a length of time the authentication data is valid.

6. The method of claim 1, further comprising:
    transmitting, by the server, an assurance level request for a one-time-password ("OTP") when an assurance level associated with the authentication request is greater than or equal to a predetermined threshold.

7. The method of claim 6, wherein the OTP request is conducted by at least one of an interactive voice response ("IVR") method and a short message service ("SMS") method.

8. A system for online authentication of online attributes, the system including:
- a data storage device that stores instructions system for online authentication of online attributes; and
- a processor configured to execute the instructions to perform a method including:
  - receiving, over an electronic network, an authentication request from a relying party, the authentication request including identity information to be authenticated and credential information to be authenticated;
  - determining whether a user account is associated with the received identity information by accessing an internal database;
  - transmitting, over the electronic network to a user associated with the user account, a request for authentication data;
  - receiving, over the electronic network, authentication data associated with the user, wherein the authentication data includes a status identifier identifying one of a pending, active, suspended, and revoked status, wherein the status identifier is placed in the suspended status after receiving a revocation request and the status identifier is placed in the revoked status after authenticating the revocation request by comparing an assurance level associated with the revocation request to a predetermined assurance level;
  - transmitting, over the electronic network to a verification data source server, authentication data associated with the user; and
  - receiving, over the electronic network, an authentication result from the verification data source server for the user associated with authentication data.

9. The system according to claim 8, wherein the processor is further configured to execute the instructions to perform the method including:
- storing the authentication data in the user data of the user account associated with the user.

10. The system according to claim 8, wherein the processor is further configured to execute the instructions to perform the method including:
- encrypting the authentication data in the user data of the user account associated with the user.

11. The system according to claim 8, wherein the processor is further configured to execute the instructions to perform the method including:
- transmitting the authentication result of the authentication request to the relying party.

12. The system according to claim 8, further wherein the authentication data further includes a lifetime value, wherein the lifetime value identifies a length of time the authentication data is valid.

13. The system according to claim 8, wherein the processor is further configured to execute the instructions to perform the method including:
- transmitting an assurance level request for a one-time-password ("OTP") when an assurance level associated with the authentication request is greater than or equal to a predetermined threshold.

14. The system according to claim 13, wherein the OTP request is conducted by at least one of an interactive voice response ("IVR") method and a short message service ("SMS") method.

15. A non-transitory computer-readable medium storing instructions that, when executed by a computer, cause the computer to perform a method for online authentication of online attributes, the method including:
- receiving, at a server over an electronic network, an authentication request from a relying party, the authentication request including identity information to be authenticated and credential information to be authenticated;
- determining, by the server, whether a user account is associated with the received identity information by accessing an internal database;
- transmitting, by the server over the electronic network to a user associated with the user account, a request for authentication data;
- receiving, at the server over the electronic network, authentication data associated with the user identifying one of a pending, active, suspended, and revoked status, wherein the status identifier is placed in the suspended status after receiving a revocation request and the status identifier is placed in the revoked status after authenticating the revocation request by comparing an assurance level associated with the revocation request to a predetermined assurance level;
- transmitting, by the server over the electronic network to a verification data source server, authentication data associated with the user; and
- receiving, at the server over the electronic network, an authentication result from the verification data source server for the user associated with authentication data.

16. The computer-readable medium according to claim 15, further comprising:
- storing, by the server, the authentication data in the user data of the user account associated with the user.

17. The computer-readable medium according to claim 15, further comprising:
- encrypting, by the server, the authentication data in the user data of the user account associated with the user.

18. The computer-readable medium according to claim 15, further comprising:
- transmitting, by the server, the authentication result of the authentication request to the relying party.

19. The computer-readable medium according to claim 15, further wherein the authentication data further includes a lifetime value, wherein the lifetime value identifies a length of time the authentication data is valid.

20. The computer-readable medium according to claim 15, further comprising:
- transmitting, by the server, an assurance level request for a one-time-password ("OTP") when an assurance level associated with the authentication request is greater than or equal to a predetermined threshold.

* * * * *